(12) United States Patent
Zhang et al.

(10) Patent No.: US 11,468,452 B2
(45) Date of Patent: *Oct. 11, 2022

(54) SYSTEMS AND METHODS FOR CONTROLLING ONLINE ADVERTISING CAMPAIGNS

(71) Applicant: Oath (Americas) Inc., Dulles, VA (US)

(72) Inventors: Jianlong Zhang, Sunnyvale, CA (US); Niklas Karlsson, Mountain View, CA (US)

(73) Assignee: YAHOO AD TECH LLC, Dulles, VA (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/656,154

(22) Filed: Oct. 17, 2019

(65) Prior Publication Data

US 2020/0051094 A1    Feb. 13, 2020

Related U.S. Application Data

(63) Continuation of application No. 13/416,796, filed on Mar. 9, 2012, now Pat. No. 10,497,010.

(51) Int. Cl.
*G06Q 30/02* (2012.01)
(52) U.S. Cl.
CPC ......... *G06Q 30/02* (2013.01); *G06Q 30/0242* (2013.01); *G06Q 30/0249* (2013.01)
(58) Field of Classification Search
CPC . G06Q 30/02; G06Q 30/0242; G06Q 30/0249
See application file for complete search history.

(56) References Cited

U.S. PATENT DOCUMENTS

| 7,835,937 B1 | 11/2010 | Karlsson et al. |
| 2008/0103898 A1* | 5/2008 | Flake ................. G06Q 30/0277 |
| | | 705/14.41 |

(Continued)

OTHER PUBLICATIONS

Chen, Ye et al: "Real Time Bidding Algorithms for Performance-Based DIsplay Ad Allocation", KDD '11 Proceedings of the 17th ACM SIGKDD international conference on Knowledge discovery and data miningpp. 1307-1315. (Year: 2011).*

*Primary Examiner* — Katherine Kolosowski-Gager
(74) *Attorney, Agent, or Firm* — Bookoff McAndrews, PLLC

(57) ABSTRACT

Systems and methods are provided for controlling an online advertising campaign. In one embodiment, a computer-implemented method for controlling an online advertising campaign includes receiving a feedback signal reflecting delivery of the online advertising campaign, and comparing the feedback signal to a delivery reference to generate a campaign level control signal. The method further includes receiving a maximum impression bid price for an inventory unit of the online advertising campaign, the maximum bid price for the at least one inventory unit being set by a user, and calculating, using at least one processor, at least a final bid price based on the maximum bid price, on the campaign level control signal, and on an optimization objective for the online advertising campaign, the optimization objective being set by the user. The method also includes submitting, to an electronic market and based on the calculated final bid price, a bid on an impression from the inventory unit.

18 Claims, 10 Drawing Sheets

(56) References Cited

U.S. PATENT DOCUMENTS

| | | | |
|---|---|---|---|
| 2008/0255936 A1* | 10/2008 | Ghate | G06Q 30/0277 |
| | | | 705/14.69 |
| 2008/0262914 A1 | 10/2008 | Suveyke et al. | |
| 2008/0270223 A1* | 10/2008 | Collins | G06Q 30/02 |
| | | | 705/14.42 |
| 2010/0114716 A1* | 5/2010 | Heilig | G06Q 30/08 |
| | | | 705/14.71 |
| 2010/0262455 A1* | 10/2010 | Karlsson | G06Q 30/0275 |
| | | | 705/14.45 |
| 2011/0270675 A1 | 11/2011 | Veach | |

* cited by examiner

SYSTEMS AND METHODS FOR CONTROLLING ONLINE ADVERTISING CAMPAIGNS

CROSS-REFERENCE TO RELATED APPLICATION(S)

This patent application is a continuation of and claims the benefit of priority to U.S. application Ser. No. 13/416,796, filed on Mar. 9, 2012, which is incorporated herein by reference in its entirety.

TECHNICAL FIELD

The present disclosure relates generally to online advertising and computerized systems and methods for operating and controlling the same. More specifically, and without limitation, the present disclosure relates to systems and methods for controlling one or more aspects related to an online advertising campaign, such as bid price and bid allocation.

BACKGROUND

Internet advertisers often create online advertising campaigns that include numerous advertisements (e.g., "banner ads") designed to be placed on websites during a specified period of time. For example, a company may design several advertisements for a product, and may wish to have the advertisements placed on websites during the sale of the product. Each time one of these advertisements is shown to a website visitor is known as an "impression." When shown the advertisement, the user may select, r "click," on the advertisement or may take another "action" such as completing an online form to request more information. If the user later purchases the product, the purchase is referred to as a "conversion" of the impression.

Advertisers may be interested in impressions (e.g., if they are trying to increase awareness of a brand), clicks (e.g., if they are trying to provide more information about a product), or conversions (e.g., if they are trying to make sales or get new users to sign up for services). Advertisers may pay based on, for example, impressions, clicks, r conversions over the course of an advertising campaign. An advertiser may have a spending plan that specifies how the advertiser wishes to spend its budget during a campaign. For example, the advertiser may wish to spend money only on certain days during the campaign, or may wish to spend evenly over every day of the campaign. Each advertiser may have a daily budget (e.g., $1,000 per day) and/or a daily goal of impression volume (e.g., 1000 impressions per day), known as "daily delivery" or "pacing." Each advertiser may also desire an ad campaign to perform certain types of consumer targeting and/or achieve a particular distribution of advertisements across various websites ("spreading").

As a result, various techniques are used to manage online ad delivery within and among advertising campaigns. In certain advertising networks, ad servers receive impression requests from publishers (e.g., websites r other entities with an inventory of online ad space). The ad servers may group ad requests from various advertising campaigns, e.g., according to impressions to be "targeted" based on a combination of attributes defined by the ad requests. In addition to targeting requirements, each ad request received from an advertiser generally includes a "bid price" and possibly a "bid allocation". The bid price is the amount of money offered by the ad request for placement of the targeted impression. The bid allocation, if present, is the ratio (e.g., point value from 0 to 1) of targeted inventory the ad campaign is willing to purchase at the bid price. The list of ads that target a certain impression request may be sorted in descending order according to their bid price, and then placed in groups such that the sum of their bid allocations equals 1. If the ad request with the highest bid price has a bid allocation of 1, or if the bid allocation does not exist, it will always win the impression. Such ad delivery methods ensure that the advertiser with an ad with the greatest expected value is able to purchase as much inventory as desired. These methods also reveal both the marginal value of the impression inventory (e.g., the cost required per impression), and the amount of volume (e.g., the number of impressions) purchased at each price.

This type of competitive bidding marketplace may be problematic, however, from the perspective of the user (i.e., advertiser). For example, while conventional online advertising campaigns may control delivery in a way that balances advertisers' return on investment with publishers' revenue, they do not necessary optimize performance in favor of the user. Additionally, while ad networks may be aware of the techniques used to control campaign delivery, such techniques are not necessarily apparent to the user.

SUMMARY

In accordance with one disclosed exemplary embodiment, a system is provided for controlling an online advertising campaign. The system may include a sensor configured to provide a feedback signal reflecting a delivery of the online advertising campaign. The system may further include a campaign controller configured to compare the feedback signal to a delivery reference and to generate a campaign level control signal based on the comparison. The system may further include an actuator. The actuator may be configured to receive a maximum impression bid price for an inventory unit of the online advertising campaign, the maximum bid price for the at least one inventory unit being set by a user. The actuator may be further configured to calculate at least a final bid price based on the maximum bid price, on the campaign level control signal, and on an optimization objective for the online advertising campaign, the optimization objective being selected by the user. Additionally, the system may submit, to an electronic market and based on the calculated final bid price, a bid on an impression from the inventory unit.

In accordance with another disclosed exemplary embodiment, a computer-implemented method is provided for controlling an online advertising campaign. The method may include receiving a feedback signal reflecting a delivery of the online advertising campaign, and comparing the feedback signal to a delivery reference to generate a campaign level control signal. The method may further include receiving a maximum impression bid price for an inventory unit of the Nine advertising campaign, the maximum bid price for the at least one inventory unit being set by a user. The method may further include calculating, using at least one processor, at least a final bid price based on the maximum bid price, on the campaign level control signal, and on an optimization objective for the online advertising campaign, the optimization objective being selected by the user. The method may also include submitting, to an electronic market and based on the calculated final bid price, a bid on an impression from the inventory unit.

In accordance with another disclosed exemplary embodiment, a computer-implemented method is provided for controlling an online advertising campaign. This method may include receiving a feedback signal reflecting a delivery of the online advertising campaign, and comparing the feedback signal to a delivery reference to generate a campaign level control signal. The method may further include receiving a maximum impression bid price for an inventory unit of the online advertising campaign, the maximum bid price for the at least one inventory unit being set by a user, detecting ad events associated with the inventory unit and determining an ad event rate based on the detected ad events, and calculating a performance value for the inventory unit based on the ad event rate. Additionally, the method may include calculating, using at least one processor, a final bid price based on the maximum bid price, on the performance value, on the campaign level control signal, and on an optimization objective for the online advertising campaign that is selected by the user. Them method may further include submitting, to an electronic market and based on the calculated final bid price, a bid on an impression from the inventory unit.

DETAILED DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

Figure 1:
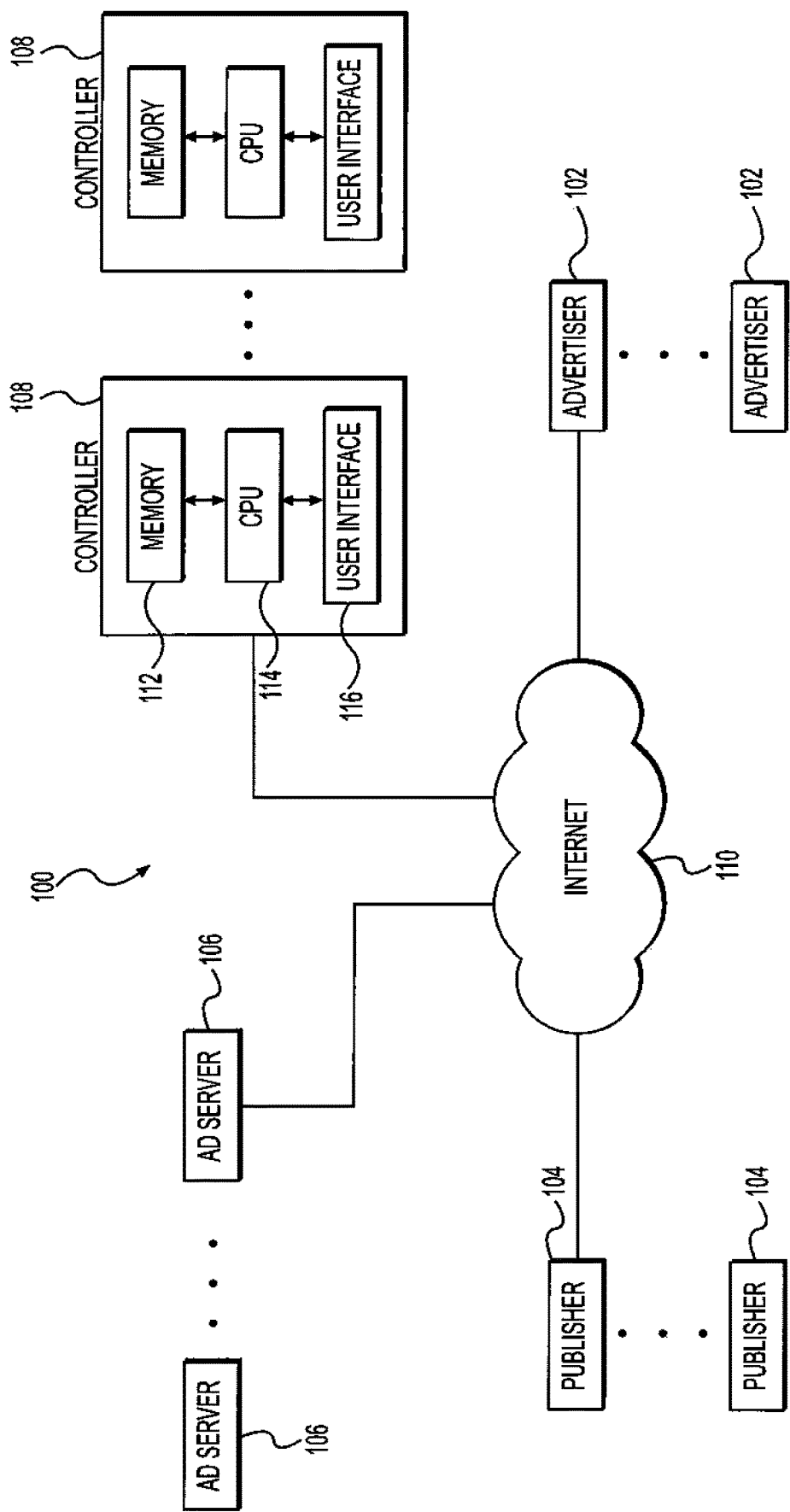
FIG. 1 depicts a block diagram of an exemplary system in which online advertising campaigns may be controlled, consistent with embodiments of the present disclosure.

FIG. 1 illustrates an exemplary system 100 for controlling online advertising campaigns, consistent with embodiments of the present disclosure. As shown in FIG. 1, system 100 may include one or more advertisers 102, publishers 104, ad servers 106, and controllers 108, that are in communication with one another through a network, such as the Internet 110. The number and orientation of the computing components in FIG. 1 is provided for purposes of illustration only. Any other number and orientation of components is possible. For example, one or more of advertisers 101, publishers 104, ad servers 106, and controllers 108 may be combined or co-located and/or communicate directly with one another, instead of over Internet 110. The components of FIG. 1 may include any type or configuration of computers and/or servers, such as, for example, a server cluster, a server farm, load balancing servers, distributed servers, etc. In addition, each component may include one or more processors, memories or other data storage devices (i.e., computer-readable storage media), such as hard drives, NOR or NAND flash memory devices, or Read Only Memory (ROM) devices, etc., communications devices, and/or other types of computing elements.

Advertisers 102 may include entities having online advertisements (e.g., banner ads, pop-ups, etc.) they desire to deliver to online consumers. Advertisers 102 may interact with publishers 104, ad servers 106, and/or controllers 108 through computers or servers connected to the Internet 110. Thus, advertisers 102 may be able to communicate advertising information, such as ad information, targeting information, consumer information, budget information, bidding information, etc., to other entities in system 100.

Publishers 104 may include entities having inventories of available online advertising space. For example, publishers 104 may include online content providers, search engines, e-mail programs, web-based applications, or any entity or program having online user traffic. Publishers 104 may interact with advertisers 102, ad servers 106, and/or controllers 108 via computers or servers connected to the Internet 110. Thus, publishers 104 may be able to communicate inventory information, such as site information, demographic information, cost information, etc., to other entities in system 100.

Ad servers 106 may include servers or clusters of servers configured to process advertising information from advertisers 102 and/or inventory information from publishers 104, either directly or indirectly. In certain embodiments, ad servers 106 may be remote web servers that receive advertising information from advertisers 102 and serve ads to be placed by publishers 104. Ad servers 106 may be configured to serve ads across various domains of publishers 104, for example, based on advertising information provided by advertisers 102. Ad servers 106 may also be configured to serve ads based on contextual targeting of web sites, search results, and/or user profile information. In some embodiments, ad servers 106 may be configured to serve ads based on control signals generated by controllers 108.

Controllers 108 may include computing systems configured to receive information from entities in system 100, process the information, and generate advertising control signals to be sent to entities in system 100, according to the exemplary methods described herein. Controllers 108 may include any type or combination of computing systems, such as clustered computing machines and/or servers. In one embodiment, each controller 108 may be an assembly of hardware, including a memory 112, a central processing unit ("CPU"), and/or a user interface 116. Memory 112 may include any type of RAM or ROM embodied in a physical, computer-readable storage medium, such as magnetic storage including floppy disk, hard disk, or magnetic tape;

semiconductor storage such as solid state disk (SSD) or flash memory; optical disc storage; or magneto-optical disc storage. CPU 114 may include one or more processors for processing data according to instructions stored in the memory, for example to perform the disclosed methods and processes. The functions of the processor may be provided by a single dedicated processor or by a plurality of processors. Moreover, the processor may include, without limitation, digital signal processor (DSP) hardware, or any other hardware capable of executing software. User interface 116 may include any type or combination of input/output devices, such as a display monitor, graphical user interface, touch-screen or pad, keyboard, and/or mouse.

Figure 2:
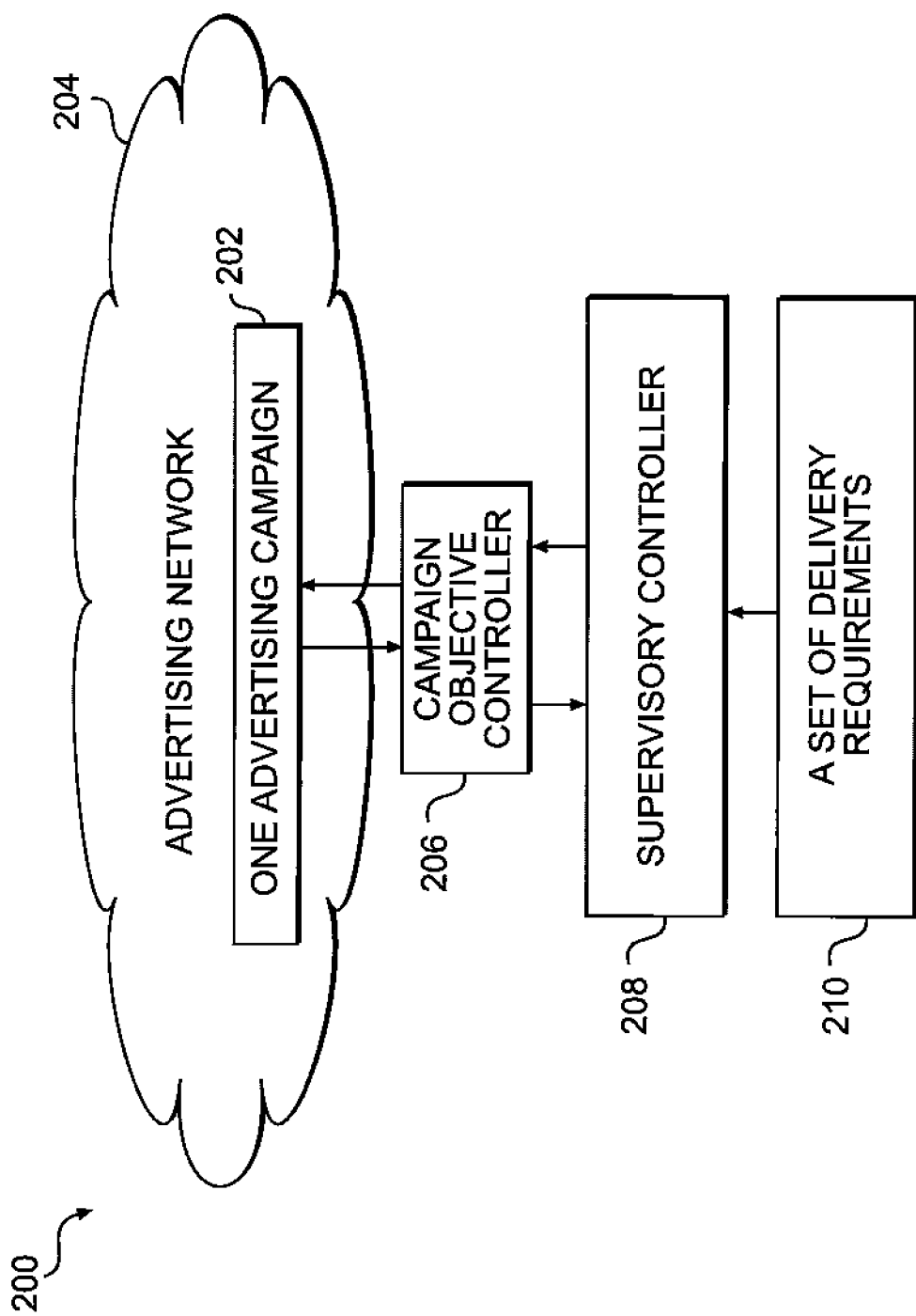
FIG. 2 illustrates an exemplary control system for controlling online advertising campaigns in an advertising network, consistent with embodiments of the present disclosure.

FIG. 2 illustrates an exemplary control system 200 for controlling an online advertising campaign 202 operating in an online advertising network 204, such as an online advertising network of system 100. Advertising network 204 may include a network or collection of one or more publishers 104, ad severs 106, controllers 108, or other components of system 100. Elements of advertising network 204 may operate to receive impression requests associated with ne or more ad inventories, e.g., from publishers such as websites or other entities with an inventory of online ad space. Advertising network 204 may also group impression requests for various advertising campaigns, e.g., according to impressions to be "targeted" based on a combination of attributes defined by the ad requests. Advertising network 204 may also accept bids on the impression requests, e.g., from one or more controllers 108, and process the bids to serve ads on the ad inventories associated with publishers 104.

Of course, any number or type of advertising campaigns 202 may be operated within advertising network 204, across various ad servers and domains associated with the Internet. Control system 200 may be implemented by one or more of the advertisers 102, publishers 104, ad servers 106, and/or controllers 108 described in FIG. 1. For example, control system 200 may represent the interaction of one or more of controllers 108 with other entities in system 100.

In one embodiment, control system 200 may include, among other control modules, campaign objective controller 206, which may be at least partially managed by a supervisory controller 208. Campaign objective controller 206 and supervisory controller 208 may comprise computers or servers connected to the Internet, as described with respect to ad servers 106 and controllers 108 of system 100. Alternatively, campaign objective controller 206 and supervisory controller 208 may be software modules executed by CPUs 114 of controllers 108 and/or ad servers 106. Campaign objective controller 206 and supervisory controller 208 may be embodied entirely in hardware, entirely in software, or in a combination of hardware and software.

Supervisory controller 208 may be provided with a set of delivery requirements 210, which may be adjustable design parameters set by a user. For instance, the set of delivery requirements may include daily budget goals, daily impression delivery goals, targeting instructions, eCPM (effective cost per thousand impressions) constraint, eCPC (effective cost per click) constraint, eCPA (effective cost per action) constraint, and/or spread constraints for controlling advertising across inventory units and/or user targets, and/or spread constraints for controlling advertising across inventory units, etc. The set of delivery requirements 210 may be implemented by one or more controllers of system 200, including campaign objective controller 206 and supervisory controller 208.

In one embodiment, campaign objective controller 206 may be a controller configured to assist an advertising campaign 202 in meeting daily budget and impression goals. Consistent with the disclosed embodiments, campaign objective controller 206 may be configured to control bid price and allocation signals to optimize the spending of ad campaign revenue in accordance with an objective set by a user. Such objectives may include, for example, a smoothness objective in which campaign objective controller 206 manages campaign delivery to achieve smoothness in revenue spending over the course of the campaign, and/or a cost-reduction objective in which campaign objective controller 206 manages campaign delivery to reduce average cost per impression ("eCPM"), average cost per click ("eCPC"), and/or average cost per other action ("eCPA") (e.g., conversion), over the course of the campaign. In one embodiment, campaign objective controller 206 may implement at least some of the exemplary systems and methods described in U.S. patent application Ser. No. 11/907,587, filed on Oct. 15, 2007 (now U.S. Pat. No. 7,835,937), the entire disclosure of which is incorporated herein by reference.

Figure 3:
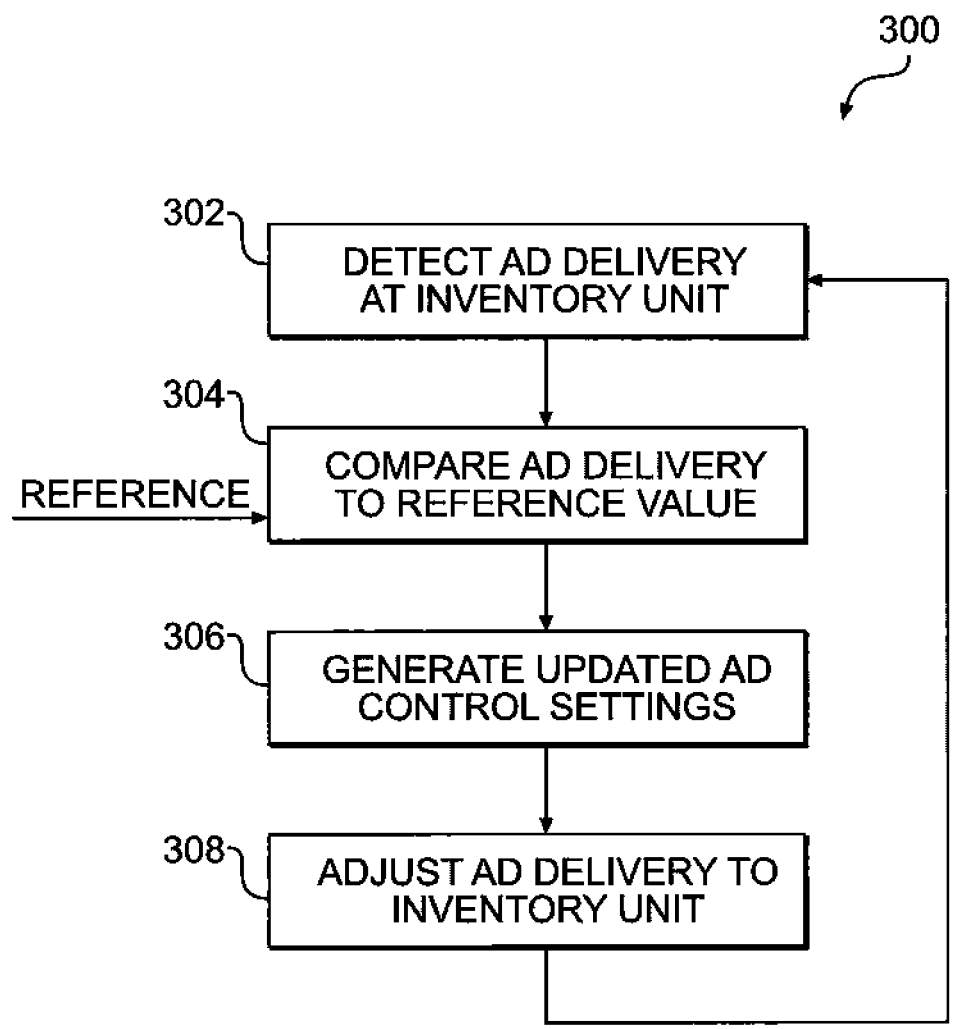
FIG. 3 illustrates a flow diagram of an exemplary method for controlling online advertising campaigns, consistent with embodiments of the present disclosure.

FIG. 3 depicts a flow diagram illustrating an exemplary control method 300 performed by campaign objective controller 206 to control ad delivery across various inventory units of an ad campaign, consistent with embodiments of the present disclosure. As will be described in more detail below, control method 300 may include one or more steps for adjusting the distribution of ad delivery as measured by impressions, clicks, conversions, or any other events occurring for each inventory unit of an ad campaign.

As illustrated in FIG. 3, control method 300 may begin by detecting ad delivery at a particular inventory unit (step 302). For example, the method may involve determining how many impressions, clicks, or events are associated with a particular website in a particular period of time. Control method 300 may then compare ad delivery at that inventory unit to a reference value received for that inventory unit (step 304). The reference value may be a particular quantity of ad impressions, clicks, or events that have been calculated by spread controller 208 and/or supervisory controller 210.

The method may further involve generating updated ad control settings for the inventory unit based on the comparison to the reference value (step 306). The updated ad control settings may include an updated bid price control signal and/or an updated bid allocation control signal. For example, if delivery to the particular inventory unit is higher than the reference value, then the bid price and/or bid allocation values may be reduced accordingly to limit the competitiveness of the ad campaign relative to the inventory unit.

The method may further include adjusting ad delivery to the inventory unit by implementing the generated updated ad control settings (step 308). For example, the updated bid price control signal and/or bid allocation control signal may be sent to an actuator associated with the inventory unit. The method may continue to operate in a closed-loop, by again detecting ad delivery at the inventory unit (step 302).

Figure 4:
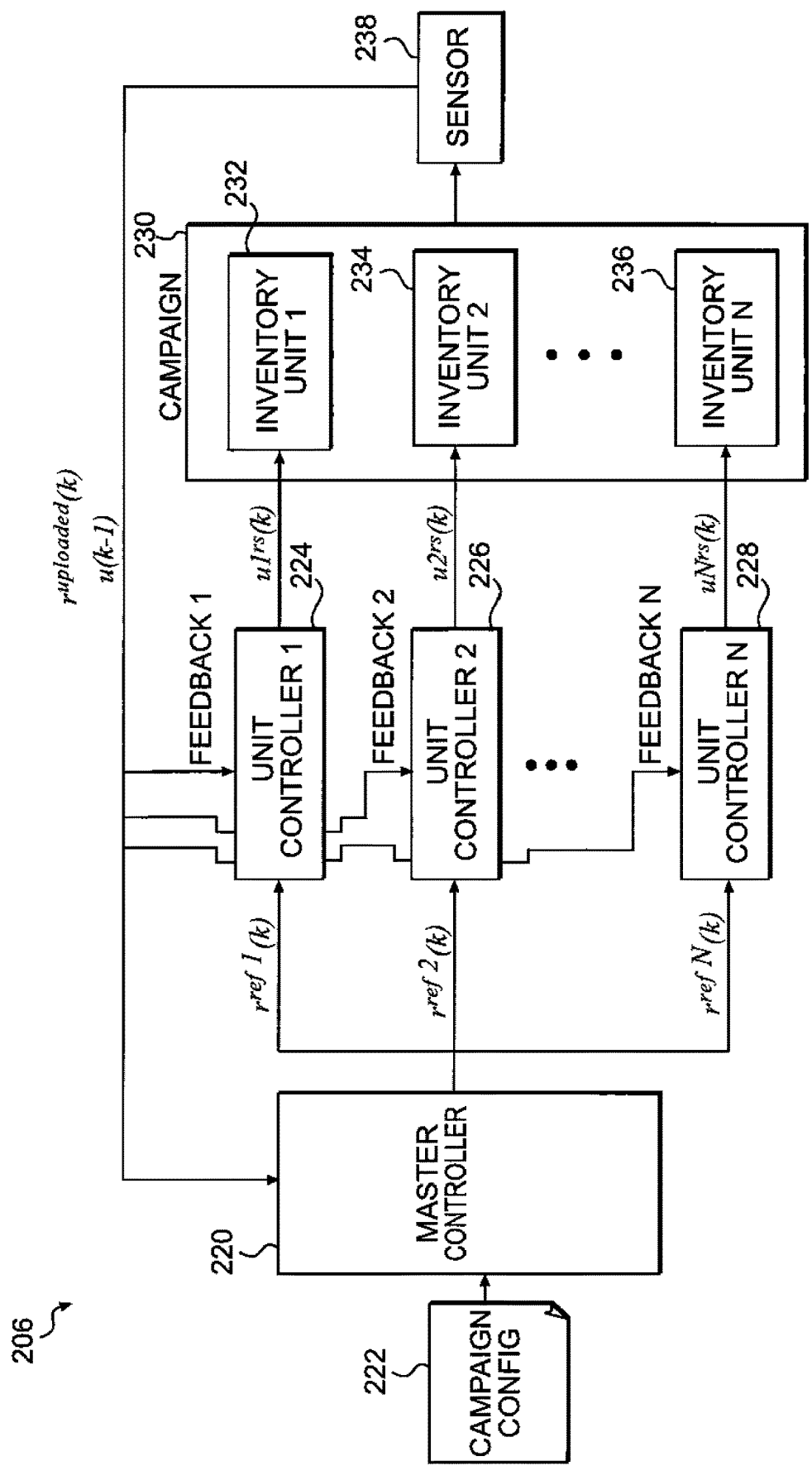
FIG. 4 depicts a block diagram of an exemplary system for controlling online advertising campaigns, consistent with embodiments of the present disclosure.

FIG. 4 depicts an exemplary embodiment of campaign objective controller 206, consistent with embodiments of the present disclosure. As shown in FIG. 4, campaign objective controller 206 may include a master campaign controller 220, a plurality of unit controllers 224-228, and a sensor 238. Each campaign objective controller 206 may be associated with a particular ad campaign 230, for which ads are served on a plurality of inventory units 232-236. In general, campaign 230 may represent the system (or "plant," as it is referred to in control theory), for which ad delivery may be controlled by campaign objective controller 206.

Master controller 220 of campaign objective controller 206 may be provided with campaign configuration information 222. For example, as described above with respect to the suite of delivery requirements 212 associated with supervisory controller 208, campaign configuration information 222 may be defined by user input, which may include maximum bid price, maximum and minimum delivery ratios, daily budgets, targeting information, event requirements, and/or other campaign configuration information. For example, in one embodiment, campaign configuration information 222 may include instructions to bid no more than a maximum allowed cost for impression $r_{ij}^{max}(k)$ for a given inventory unit (e.g., a set of inventory cells {i,j}), set by the user (i.e., advertiser). Campaign configuration information 222 may also include instructions regarding which campaign delivery objective (e.g., smoothness, eCPM, eCPC, eCPA) the user has set for the campaign 230. In addition, campaign configuration information 222 may include other configuration information for the campaign 230. As described above, each inventory unit may be a single URL, an entire domain, any desired groups of websites, audience segment, website-audience segment, etc. Thus, the user may selectively limit delivery across inventory units of websites or groups of websites, as desired. Master controller 220 may be configured to receive feedback from sensor 238 and generate delivery revenue reference signals $r^{ref}(k)$ designed for particular unit controllers 224-228, based on the campaign configuration information 222 and on the feedback from sensor 238.

Master controller 220 may be disposed in communication with the plurality of unit controllers 224-228. Unit controllers 224-228 may be individualized controllers configured to generate updated campaign-level control signals, $u^{rs}(k)$, designed for respective inventory units 232-236 of campaign 230. For example, as shown in FIG. 4, unit controller 224 may generate a campaign level control signal $u1^{rs}(k)$ for inventory unit 232 of campaign 230, unit controller 226 may generate a control signal $u2^{rs}(k)$ for inventory unit 234 of campaign 230, and so on. Each control signal $u^{rs}(k)$ may embody ad delivery instructions, such as instructions to modify (i.e., increase or decrease) bid price value and/or bid allocation for each respective inventory unit 232-236 of campaign 230.

Master controller 220 may also be disposed in communication with sensor 238, which is disposed in communication with, and configured to detect conditions of, inventory units of campaign 230. Sensor 238 may be configured to obtain real-time data about one or more inventory units on which ads are delivered for campaign 230. For example, sensor 238 may measure operating conditions of campaign 230, such as impression, click, event, action volumes and/or rates, and/or revenue for each inventory unit 232-236. In one embodiment, sensor 238 may output a marginal revenue reported at time k $r^{uploaded}(k)$ for campaign 230. Additionally, or alternatively, sensor 238 may output metrics representing other operating conditions of campaign 230, such as marginal impression volume n(k), a reference impression volume $n^{ref}(k)$, a preceding control signal u(k−1), and/or an uploaded impression volume $n^{uploaded}(k)$, for each time k of a campaign. Sensor 238 may be configured to feed such data to master controller 220 and to one or more of the unit controllers 224-228.

Unit controllers 224-228 may be configured to receive reference signals from master controller 220 and feedback signals from sensor 238. Unit controllers may further be configured to generate campaign level control signals, $u^{rs}(k)$, based on those inputs for each time k of a campaign. For example, unit controllers 224-228 may be configured to modify ad delivery settings (e.g., bid price and/or bid allocation) for particular inventory units of campaign 230, by sending updated ad delivery control signals $u^{rs}(k)$. In general, each unit controller 224-228 may a compare a delivery reference (e.g., desired marginal revenue) signal $r^{ref}(k)$ received at time k from master controller 220 with feedback signals $r^{uploaded}(k)$ received from sensor 238, to determine how to adjust ad delivery control settings.

Figure 5A:
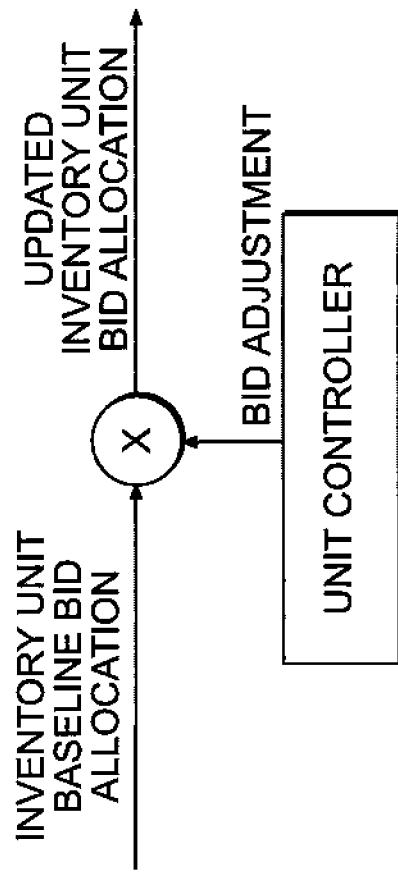
FIG. 5A illustrates an exemplary embodiment of a unit controller for adjusting a bid allocation, consistent with embodiments of the present disclosure.
Figure 5B:
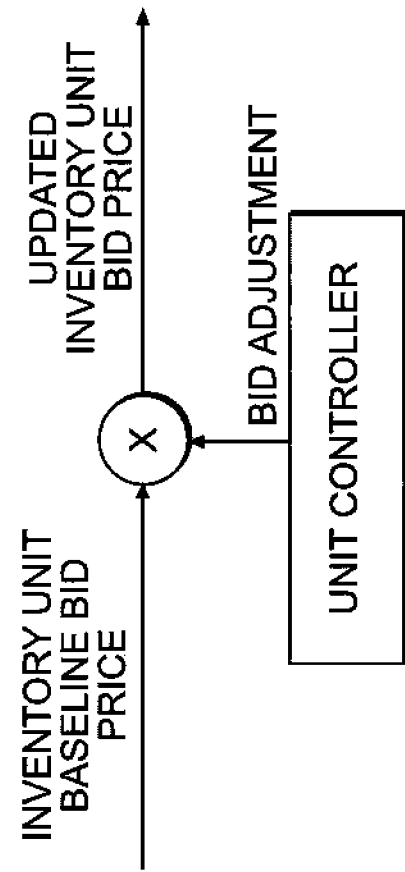
FIG. 5B illustrates an exemplary embodiment of a unit controller for adjusting a bid price and/or bid allocation, consistent with embodiments of the present disclosure.

FIGS. 5A and 5B illustrate an exemplary embodiment for how unit controllers 224-226 may modify campaign level control signals sent to particular inventory units (e.g., a set of inventory cells {i,j}) of an ad campaign. Specifically, FIG. 5A illustrates a unit controller applying a multiplicative bid adjustment to a campaign level baseline bid allocation control signal for an inventory unit, in order to generate an updated campaign level inventory unit bid allocation control signal. For example, if delivery at an inventory unit is too high, the unit controller may reduce the bid allocation value from 1.0 to 0.8 by multiplying the bid allocation value by 0.8. Thus, the unit controller may reduce the ad delivery to a particular inventory unit by selectively reducing the campaign level bid allocation control signal for that inventory unit.

In addition to adjusting the bid allocation value, each unit controller may also, or alternatively, adjust the bid price value for the inventory unit. FIG. 5B illustrates a unit controller applying a multiplicative bid adjustment to a campaign level baseline bid price control signal for an inventory unit, in order to generate an updated campaign level inventory unit bid price control signal. For example, if delivery at an inventory unit is too high, the unit controller may modify the campaign level control signal to reduce the bid price value 0.8 to 0.6. Thus, the unit controller may reduce the ad delivery to a particular inventory unit by selectively reducing the competitiveness of the bid price for that inventory unit. The ad delivery to a particular inventory unit of a campaign may be selectively reduced by any desired combination or ratio of reductions in the bid price and bid allocation campaign level control signals. Of course, the unit controllers may increase or decrease the bid allocation and/or bid price by any other suitable mathematical operation, such as addition, or the application of any suitable function. Although FIGS. 5A and 5B illustrate separate unit controllers for bid allocation and bid price, it is noted that the same common unit controller may perform both functions, depending upon the desired implementation.

Figure 6:
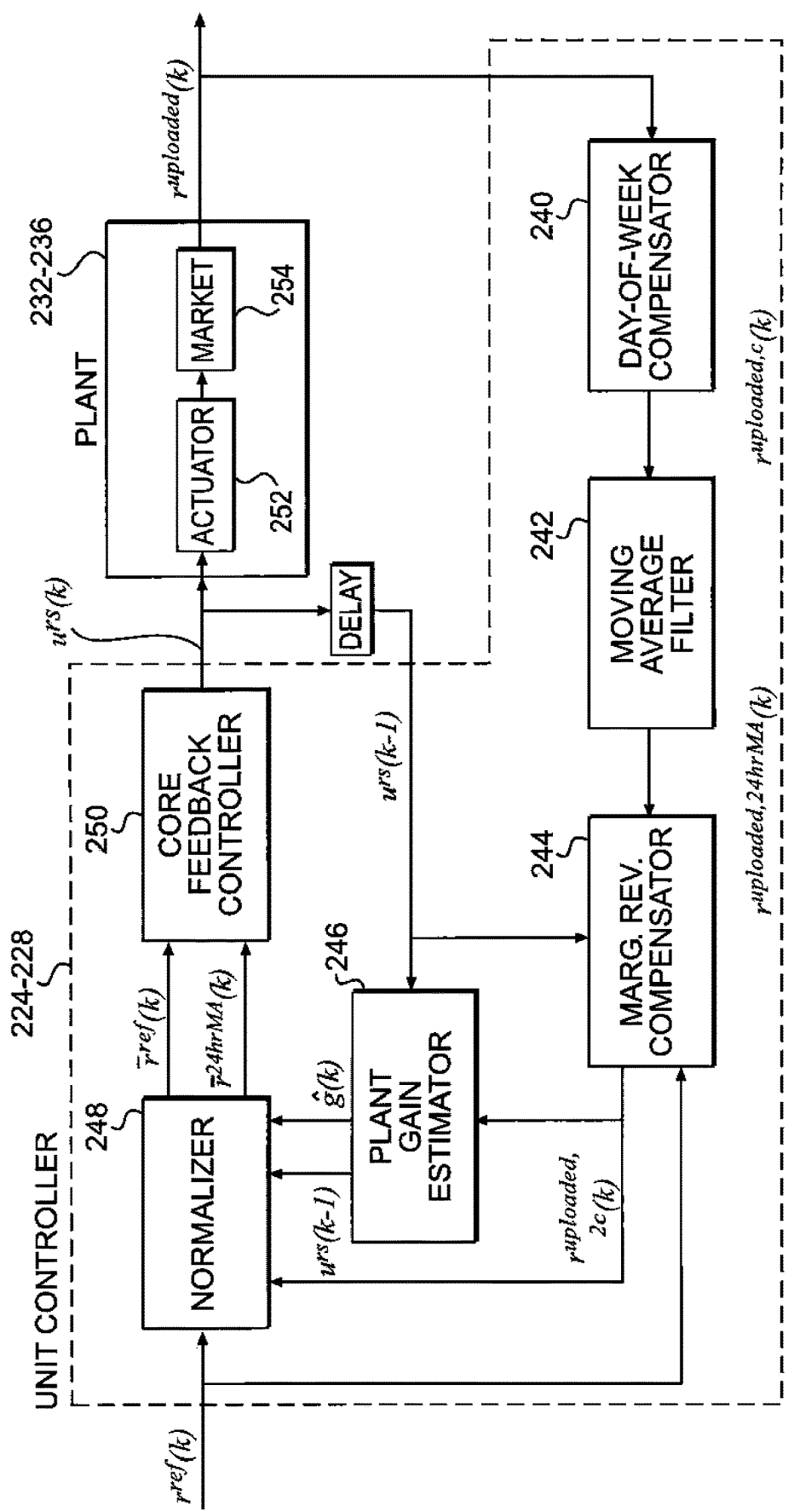
FIG. 6 illustrates an exemplary embodiment of a unit controller for controlling online advertising campaigns, consistent with embodiments of the present disclosure.

FIG. 6 illustrates one exemplary embodiment for one of the unit controllers 224-228 associated with an inventory unit 232-236, consistent with embodiments of the present disclosure. In general, for each unit time k of a campaign, a unit controller may receive a signal representing marginal revenue, $r^{uploaded}(k)$, consumed at the inventory unit (i.e., "feedback"), and the delivery revenue reference signal, $r^{ref}(k)$, from the master controller 220. The marginal revenue, $r^{uploaded}(k)$, may represent the amount of marginal revenue consumed by the inventory unit since the last sampling, as detected by a sensor at the inventory unit. The delivery reference revenue signal, $r^{ref}(k)$, may be a desired revenue of advertising events (e.g., impressions, clicks, conversions, etc.) consumed by an inventory unit, as generated by master controller 220. Using the marginal revenue, $r^{uploaded}(k)$, and delivery revenue reference signal, $r^{ref}(k)$, the unit controller may be configured to generate a campaign level control signal $u^{rs}(k)$ to be applied to an inventory unit 232-236 of a campaign. As described above with respect to FIG. 4, the exemplary systems and methods disclosed herein may include or utilize a plurality of unit controllers 224-228, each being configured to generate a control signal $u^{rs}(k)$ for a particular inventory unit of an ad campaign.

In one embodiment, each unit controller 224-228 may include a plurality of different modules which, together, may be configured to calculate the campaign level control signal $u^{rs}(k)$ based on the two input signals, $r^{uploaded}(k)$, $r^{ref}(k)$, and historical data of the modules and the inventory unit. For example, in one embodiment, each unit controller may include one or more of the following modules: a day-of-week compensator 240, a moving average filter 242, a marginal revenue compensator 244, a plant gain estimator 246, a normalizer 248, and a core feedback controller 250.

Day-of-week compensator 240 may be configured to account for the fact that website traffic is generally lighter (i.e., less volume) for most websites on the weekends, as opposed to weekdays. Day-of-week compensator 240 may be configured to allow advertising event volume to follow its natural day-of-week pattern, such that a website's campaign level control signal, $u^{rs}(k)$, remains relatively constant throughout the week. In one embodiment, day-of-week compensator 240 may achieve this goal by compensating the marginal uploaded revenue $r^{uploaded}(k)$ consumed by the inventory unit, based on a ratio between the average weekday volume and the average weekend volume, which may be denoted as, $p^{weekday2weekend}$.

Thus, in one embodiment, the input to day-of-week compensator 240 may be the marginal revenue $r^{uploaded}(k)$ where k is a timestamp of the campaign, and the output may be a compensated value of the marginal uploaded revenue $r^{uploaded,c}(k)$, which has been computed as follows:

$$r^{uploaded,c}(k) = \begin{cases} \frac{h^{weekdays} p^{weekday2weekend} + (168 - h^{weekdays})}{168 p^{weekday2weekend}} r^{uploaded}(k), & \text{if } k \text{ in weekdays} \\ \frac{h^{weekdays} p^{weekday2weekend} + (168 - h^{weekdays})}{168} r^{uploaded}(k) & \text{otherwise} \end{cases}$$

where $h^{weekdays}$ represent the number of weekday hours in one week, (e.g., 120 hours=5 weekdays*24 hours/day), and 168 represents the number of hours in one week. The ratio of $p^{weekday2weekend}$ may be selected by a user based on any known experimental data, based on, for example, the corresponding ratio of the whole network or a ratio specific to a campaign at an inventory unit. Thus, day-of-week compensator 240 may generate a compensated value of the marginal uploaded volume $r^{uploaded,c}(k)$.

Moving average filter 242 may receive the compensated value of the marginal uploaded revenue, $r^{uploaded}(k)$, from day-of-week compensator 240. Similar to day-of-week compensator 240, moving average filter 242 may be configured to average out a time-of-day pattern inherent in the network. Moving average filter 242 may also be configured to reduce any noise in the volume signal. For this purpose, moving average filter 242 may incorporate any desired time interval, such as an interval of 24 hours (i.e., a "lookback window"). During a particular 24 hour lookback window, moving average filter 242 may generate a value, $r^{uploaded,24hrMA}(k)$, which may represent the 24-hour moving sum of $r^{uploaded,c}(k)$ for a given lookback window. Of course, $r^{uploaded,24hrMA}(k)$ may represent the moving sum of $r^{uploaded,24hrMA}(k)$ for any predetermined time interval. In an embodiment in which lookback window is 24 hours, moving average filter 242 may be implemented as follows:

$$r^{uploaded,24hrMA}(k) = \frac{1}{24 f^{sampling}} \sum_{\ell=0}^{\ell=24 f^{sampling}-1} r^{uploaded,2c}(k-\ell),$$

where $f^{sampling}$ is the sampling frequency in cycles/hour, and $r^{uploaded,2c}(k)$ represents the marginal revenue after hard-stop-cap (DOW) compensation.

Marginal revenue compensator 244 may be configured to compensate for the marginal uploaded value of the moving sum, $r^{uploaded,24hrMA}(k)$, in the event that a campaign is paused for external reasons. For example, if a campaign is paused due to daily budgetary or delivery constraints imposed by another controller, the marginal uploaded revenue, the marginal revenue $r^{uploaded}(k)$, and therefore the compensated marginal uploaded revenue, $r^{uploaded,c}(k)$, may both reduce to zero. In such circumstances, unless compensation is performed, the controller may operate in an open-loop mode in which the campaign level control signal, $u^{rs}(k)$, is aggressively increased out of a desire to increase event volume. In order to compensate for such low volume events, marginal revenue compensator 244 may be configured to receive the marginal uploaded value of the moving sum, $r^{uploaded,24hrMA}(k)$ from moving average filter 242.

Marginal revenue compensator 244 may also receive the delivery revenue reference, $r^{ref}(k)$, from master controller 220, the moving sum, $r^{uploaded,24hrMA}(k)$ compensated by day-of-week compensator 240, from moving average filter 242, a binary signal, $u^{HSC}(k)$, which indicates whether the campaign is active. Marginal volume compensator 244 may be configured to generate a volume output, denoted $r^{uploaded,2c}(k)$, as calculated below:

$$r^{uploaded,2c}(k) = \begin{cases} r^{uploaded,c}(k) + \alpha^{MVC} \dfrac{24 f^{sampling} e^{\beta_1 \sin(2\pi k/24 + \varphi_1)}}{\sum_{\ell=0}^{\ell=24 f^{sampling}-1} e^{\beta_1 \sin(2\pi \ell/24 + \varphi_1)}} r^{ref}(k), & \text{if } u^{HSC}(k-1) = 1 \\ r^{uploaded,c}(k), & \text{otherwise} \end{cases}$$

where $\alpha^{MVC}$ is a design parameter, defaulted to be 1.

Thus, marginal revenue compensator 244 may be configured to modify the marginal uploaded revenue (i.e., increase it by a multiple of the reference value $r^{ref}(k)$), in the event that the campaign is not active and $u^{HSC}(k)$ is set to 1. Otherwise, if the campaign is active and $u^{HSC}(k)$ is set to 0, then marginal uploaded volume $r^{uploaded,2c}(k)$ may be unaltered by marginal volume compensator 244.

Plant gain estimator 246 may be configured to calculate the estimated plant gain, $\hat{g}(k)$, based on the compensated moving average of the marginal uploaded revenue, $r^{uploaded,2c}$ and the control signal generated in the previous sampling period, $u^{rs}(k-1)$. Thus, plant gain estimator 246 may receive the compensated moving average of the marginal uploaded revenue, $r^{uploaded,2c}(k)$, from the marginal volume compensator 244. In one embodiment, plant gain estimator 246 may define the gain, $\hat{g}(k)$, as follows:

$$\hat{g}(k) = \lambda^{gain}\hat{g}(k-1) + (1-\lambda^{gain})\frac{r^{uploaded,24hrMA}(k)}{u^{rs}(k-1)},$$

where $\lambda^{gain}$ is a design parameter, defaulted to be 0.05. Thus, plant gain estimator 246 may generate a gain signal, $\hat{g}(k)$, which is a function of the control signal of the previous sampling period, $u^{rs}(k-1)$, and the compensated moving average of the marginal uploaded revenue, $r^{uploaded,2c}(k)$.

Normalizer 248 may receive the gain signal, $\hat{g}(k)$, from plant gain estimator 246, the daily volume reference $r^{ref}(k)$ from the master spread controller 220, and the compensated moving average of the marginal uploaded revenue, $r^{uploaded,2c}(k)$. The normalizer 248 may calculate a normalized reference $\bar{r}^{24hrMA}(k)$ and a normalized feedback signal $\bar{r}^{MA}(k)$ based on the revenue reference $r^{ref}(k)$, the compensated moving-average of the marginal uploaded revenue $r^{uploaded,2c}(k)$, the estimated plant gain $\hat{g}(k)$, and the control signal generated in the previous sampling period $u^{rs}(k-1)$. In one embodiment, normalizer 248 may calculate the normalized feedback signal $\bar{r}^{24hrMA}(k)$ as follows:

$$\bar{r}^{24hrMA}(k) = \begin{cases} \lambda^{normalization}\bar{r}^{24hrMA}(k-1) + (1-\lambda^{normalization})u^{rs}(k-1), & \text{if } \hat{g}(k) = 0 \\ \lambda^{normalization}\bar{r}^{24hrMA}(k-1) + (1-\lambda^{normalization})\frac{r^{24hrMA}(k)}{\hat{g}(k)}, & \text{otherwise} \end{cases},$$

where $\lambda^{normalization}$ is a design parameter with a default values 0.975. In one embodiment, normalizer 248 may calculate the normalized reference $\bar{r}^{ref}(k)$ as follows:

$$\bar{r}^{ref}(k) = \lambda^{normalization}\bar{r}^{ref}(k-1) + (1-\lambda^{normalization})\min\left\{\frac{r^{ref,flt}(k)}{\hat{g}(k)}, \alpha^{ref2feedback}\bar{r}^{24hrMA}(k)\right\},$$

where $\alpha^{ref2feedback}$ is a design parameter with default value 1, and $$r^{ref,flt}(k) = \lambda^{ref}r^{ref,flt}(k-1) + (1-\lambda^{ref})r^{ref}(k),$$

where $\lambda^{ref}$ is a design parameter with default value 0.975. Normalizer 248 may be initialized with the following values of $\bar{r}^{24hrMA}(k)$, $r^{ref,flt}(k)$, and $\bar{r}^{ref}(k)$:

of $\bar{r}^{24hrMA}(0) = u^{rs}(0)$ $r^{ref,flt}(0) = n^{ref}(0)$ $\bar{r}^{ref}(0) = u^{rs}(0)$ Thus, normalizer 248 may be configured to generate a normalized marginal reference $\bar{r}^{ref}(k)$ (i.e., "reference signal") and a normalized moving average uploaded volume $\bar{r}^{24hrMA}(k)$ (i.e., "feedback signal") to be sent to core feedback controller 250 for generation of an updated ad delivery campaign level control signal, $u^{rs}(k)$.

Core feedback controller 250 may be configured to generate the updated control signal $u^{rs}(k)$ based on the normalized marginal reference $\bar{r}^{ref}(k)$ (i.e., "reference signal") and the normalized moving average uploaded volume $\bar{r}^{24hrMA}(k)$ (i.e., the "feedback signal"), according to the following:

$$u^{rs}(k) = \max\{u^{rs,min}, \min\{u^{rs,max}, v^{rs}(k)\}\}$$

where $u^{rs,min}$ is the minimum allowed campaign level control signal, $u^{rs,max}$ is the maximum allowed campaign level control signal, and $v^{rs}(k)$ is defined as:

$$v^{rs}(k) = (1+r_1)u^{rs}(k-1) - r_1u^{rs}(k-2) - s_0\bar{r}^{uploaded,24hrMA}(k) + (s_0+t_0)\bar{r}^{ref}(k) - t_0(1+r_0)\bar{r}^{ref}(k-1) + t_0r_{1il}\bar{r}^{ref}(k-2)$$

The core feedback controller 250 may be initialized with the following:

$u^{rs}(l) = u^{rs}(0)$ $\bar{r}^{ref}(l) = \bar{r}^{ref}(1)$ for all $l<0$, where $u^{rs}(0)$ is the initial campaign level control signal and is set based on campaign delivery requirements.

Thus, in general, core feedback controller 250 may generate a campaign level control signal, $u^{rs}(k)$, which is designed for a particular inventory unit, based on the previous control signal implemented by the inventory unit, $u^{rs}(k-1)$, the uploaded advertising event revenue, $r^{uploaded}(k)$, and the reference revenue signal, $r^{ref}(k)$. As described above, the uploaded advertising event revenue, $r^{uploaded}(k)$, implemented by core feedback controller 250 may have been compensated, normalized, and/or otherwise adjusted by one or more of the day-of-week compensator 240, moving average filter 242, marginal revenue compensator 244, plant gain estimator 246, and normalizer 248, to generate a normalized moving average uploaded revenue $\bar{r}^{24hrMA}(k)$. The reference revenue signal, $r^{ref}(k)$, received from master controller 220, may have been normalized by normalizer 248, to generate a normalized marginal reference $\bar{r}^{ref}(k)$.

In one embodiment, the campaign level control signal, $u^{rs}(k)$, generated by core feedback controller 250 may be designed to adjust or optimize a future uploaded advertising event volume, $r^{uploaded}(k)$, closer to the reference revenue signal $r^{ref}(k)$ (i.e., perform closed-loop feedback). As described above with respect to FIGS. 5A and 5B, control signal, $u^{rs}(k)$, may be a vector or matrix comprising a variety of control instructions, such as a campaign level bid price control signal, a campaign level bid allocation control signal, and/or any other targeting or budgetary instructions that impact future advertising event volume for the inventory unit. Thus, each unit controller 224-228 associated with an inventory unit of an ad campaign may comprise, among other things, a core feedback controller 250 configured to adjust or update the bid price and bid allocation components of a campaign level control signal $u^{rs}(k)$ such that the advertising event revenue, $r^{uploaded}(k)$, generally converges on the reference volume signal, $r^{ref}(k)$, if possible. In some circumstances, it may be difficult or impossible for advertising event volume, $r^{uploaded}(k)$, to completely converge on the reference volume signal, $r^{ref}(k)$, as desired, due to strong time-of-day patterns, or for example, if the control signals have become saturated (i.e., further adjustment of the bid allocation and/or bid price can no longer affect the event volume). Accordingly, it is noted that the term "optimize," as used herein, does not necessarily mean to achieve the best possible result under a given set of circumstances, but rather to control or tend toward a desired result.

FIG. 6 also illustrates that each inventory unit 232-236 may include or otherwise be associated with a unit actuator 252 that provides actuation signals, at the inventory unit level, to a bidding market 254. In one embodiment, unit actuator 252 may be part of control system 200 and implemented at a controller 108 described in FIG. 1. For example, unit actuator 252 may be part of campaign objective controller 206 (FIG. 2). But in other configurations, unit actuator 252 may be implemented at one or more of one or more of the advertisers 102, publishers 104, ad servers 106, and/or controllers 108. As with other elements of system 100, unit actuator 252 may comprise an assembly of computing hardware and/or software components configured to performed the disclosed processes.

Figure 7:
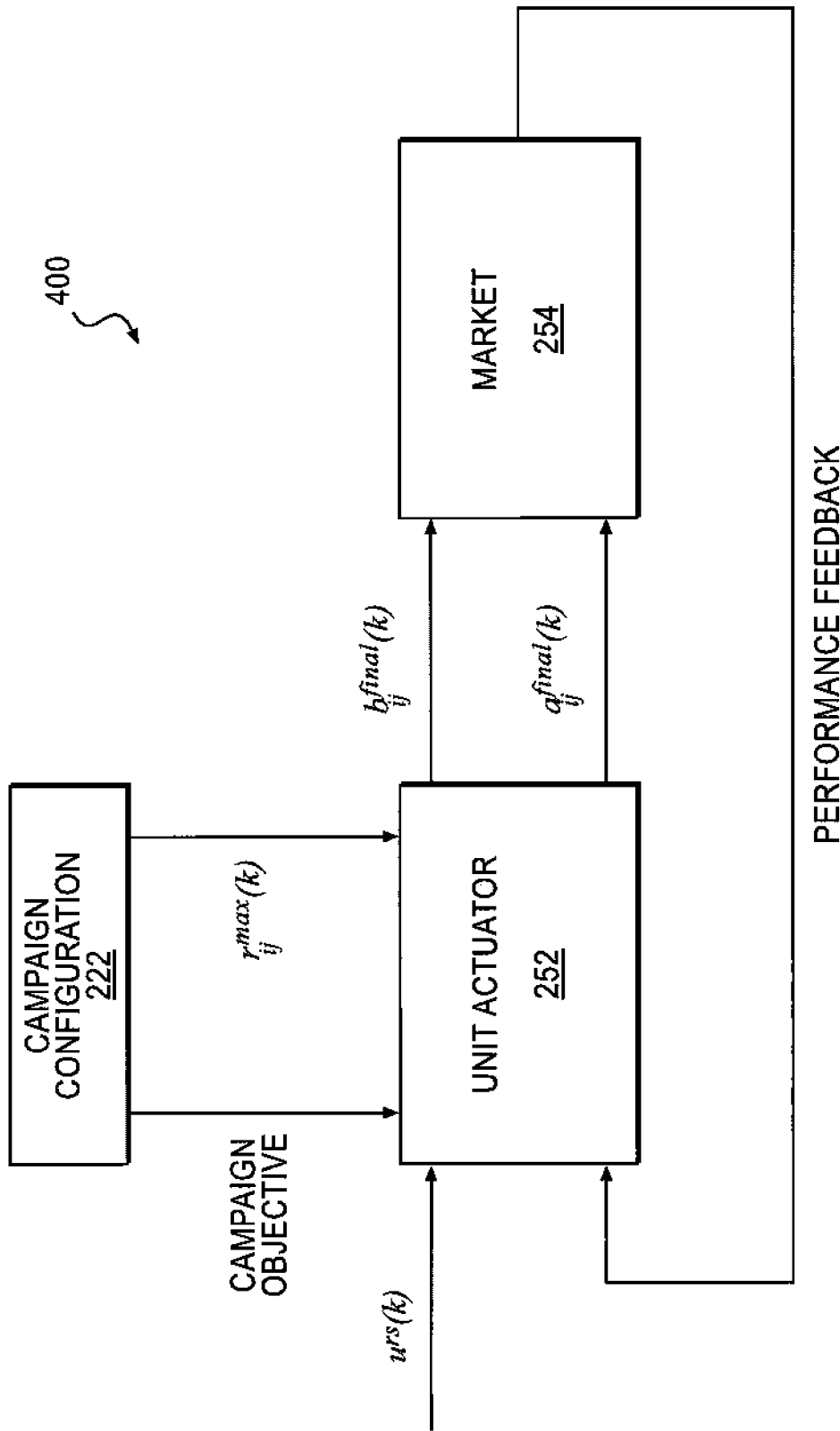
FIG. 7 illustrates an exemplary embodiment of a unit actuator in a inventory unit actuation environment, consistent with the present disclosure.

FIG. 7 illustrates unit actuator 252 in an inventory unit actuation environment 400, consistent with embodiments of the present disclosure. As shown in FIG. 7, unit actuator 252 may use campaign configuration information 222. In one embodiment, the campaign configuration information 222 may indicate one of the following optimization objectives, discussed above, selected by a user: smoothness, reduced average cost per impression ("eCPM"), reduced average cost per click ("eCPC"), and/or reduced average cost per conversion ("eCPA"). Other types of optimization objectives are contemplated, however. Additionally, the campaign configuration information 222 may further indicate the maximum allowed cost for impression, $r_{ij}^{max}(k)$, for the inventory unit 232-236 (e.g., cell {i,j}), also set by the user. (Exemplary techniques by which the user may select or set the campaign configuration information 222 are discussed in greater detail below.) Also, as shown in FIG. 7, unit actuator 252 may receive the campaign level control signal, $u^{rs}(k)$, as generated and output by feedback controller 250 (FIG. 6), as well as performance feedback information associated with the particular inventory unit 232-236. In one embodiment, the performance feedback information may include the performance information collected by the sensor 238 for the particular inventory unit 232-236, such as rate and/or volume of impressions, click-through, conversions, actions, or other types of ad events.

Unit actuator 252 may be configured to calculate a final bid price $b_{ij}^{final}(k)$ and a final bid allocation $a_{ij}^{final}(k)$ for the inventory unit 232-236 based on one or more factors. Specifically, unit actuator 252 may calculate the final bid price $b_{ij}^{final}(k)$ and final bid allocation $a_{ij}^{final}(k)$ for the selected campaign objective based on one or more of the maximum allowed cost for impression, $r_{ij}^{max}(k)$, the campaign level control signal, $u^{rs}(k)$, or the performance feedback information for the inventory unit 232-236 received from the sensor 238. Additionally, unit actuator 252 may be configured to generate signals conveying the calculated final bid price $b_{ij}^{final}(k)$ and final bid allocation $a_{ij}^{final}(k)$, and may provide these signals to market 254 to bid on impressions from inventory unit 232-236.

Figure 8:
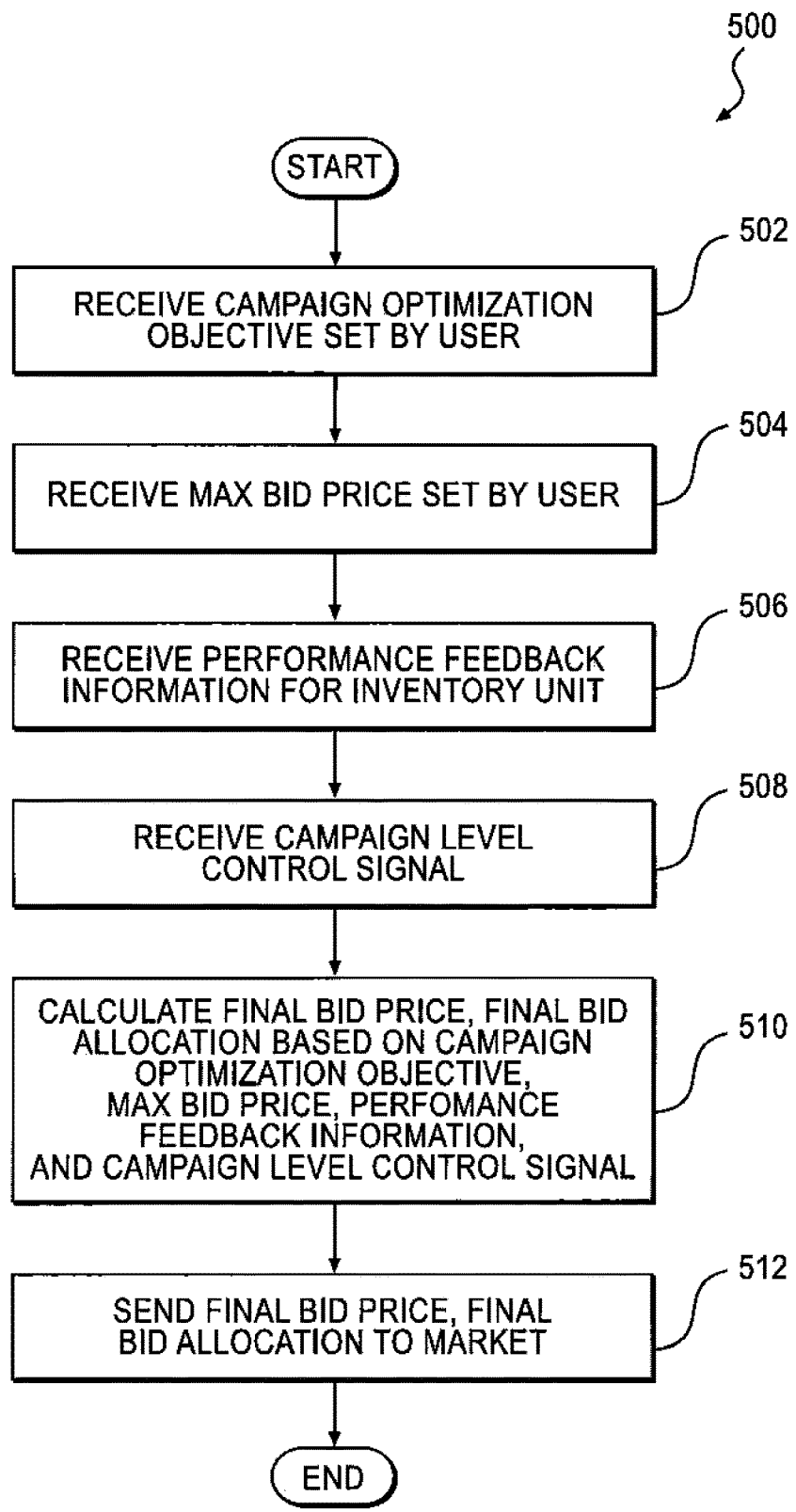
FIG. 8 illustrates a flow diagram of an exemplary method for controlling online advertising campaigns, consistent with embodiments of the present disclosure.

FIG. 8 depicts a flow diagram illustrating an exemplary method 500 that may be implemented by actuator 252 for calculating a final bid price $b_{ij}^{final}(k)$ and final bid allocation $a_{ij}^{final}(k)$ for a particular inventory unit 232-236. In one embodiment, method 500 may be performed by one or more processors associated with actuator 252, such as one or more processors of a controller 108.

Method 500 may include receiving a campaign optimization objective set by a user for the campaign (step 502). For example, as discussed below, a user associated with one of advertisers 102 may use a graphical user interface (GUI), such as a web portal to one of controllers 108, to input campaign configuration information 222 for a desired ad campaign. The input campaign configuration information 222 may include, among other things, a desired campaign optimization objective. For example, the user may select one of: a smoothness objective to smoothen revenue spending evenly over the course of the campaign, an eCPM campaign to reduce average cost per impression over the course of the campaign, a eCPC campaign to receive the average cost per click over the course of the campaign, or an eCPA campaign to reduce the average cost per conversion over the course of the campaign. Other types of campaign optimization objectives are contemplated and within the scope of the disclosed embodiments.

Method 500 may further include receiving a maximum bid price, $r_{ij}^{max}(k)$, for impression, click, conversion, action, or other ad event for the inventory unit 232-236, also set by the user (step 405). The maximum bid price, $r_{ij}^{max}(k)$, may represent the maximum dollar amount the user is willing to pay to win a bid for an impression from the inventory unit 232-236. As with step 502, the user may provide the maximum bid price, $r_{ij}^{max}(k)$ when inputting the campaign configuration information 222 via the GUI and/or web portal associated with one of controllers 108.

Method 500 may further include receiving performance feedback information for the inventory unit 232-236 (step 506). For example, sensor 238 may monitor market 254 to collect and/or measure, among other information, the rate and/or volume of impressions, click-through, conversions, actions, or other ad events associated with the inventory unit 232-236. That is, in step 506, method 500 may determine how the inventory unit 232-236 is performing in the market 254 in terms of Internet consumers' responses to ad content provided at the inventory unit 232-236. This information may be provided to one of controllers 108 in connection with performing method 500. Step 506 may occur in real-time or periodically, e.g., at a desired sampling frequency $f^{sampling}(k)$ for the campaign.

Method 500 may further include receiving the campaign level control signal $u^{rs}(k)$ for the inventory unit 232-236 (step 508). For example, as shown in FIG. 6, actuator 252 may receive the campaign level control signal $u^{rs}(k)$ as input from core feedback controller 250. As with step 506, step 508 may also occur in real-time or periodically, e.g., at the desired sampling frequency $f^{sampling}(k)$ for the campaign.

Method 500 may further include calculating a final bid price $b_{ij}^{final}(k)$ and a final bid allocation $a_{ij}^{final}(k)$ for the inventory unit 232-236 based on the selected campaign objective, the maximum allowed cost for impression, $r_{ij}^{max}(k)$, the campaign level control signal, $u^{rs}(k)$, and the performance feedback information received from the sensor 238 (step 510). As with other operations in method 500, step 510 may also occur in real-time or periodically, e.g., at the desired sampling frequency $f^{sampling}(k)$ for the campaign. Finally, method 500 may include sending the calculated final bid price $b_{ij}^{final}(k)$ and final bid allocation $a_{ij}^{final}(k)$ to market 512 (step 512). In particular, when an impression from the inventory unit 232-236 becomes available (i.e., up for auction), unit actuator 252 may submit a bid on that impression based on the calculated final bid price $b_{ij}^{final}(k)$ and final bid allocation $b_{ij}^{final}(k)$.

Figure 9:
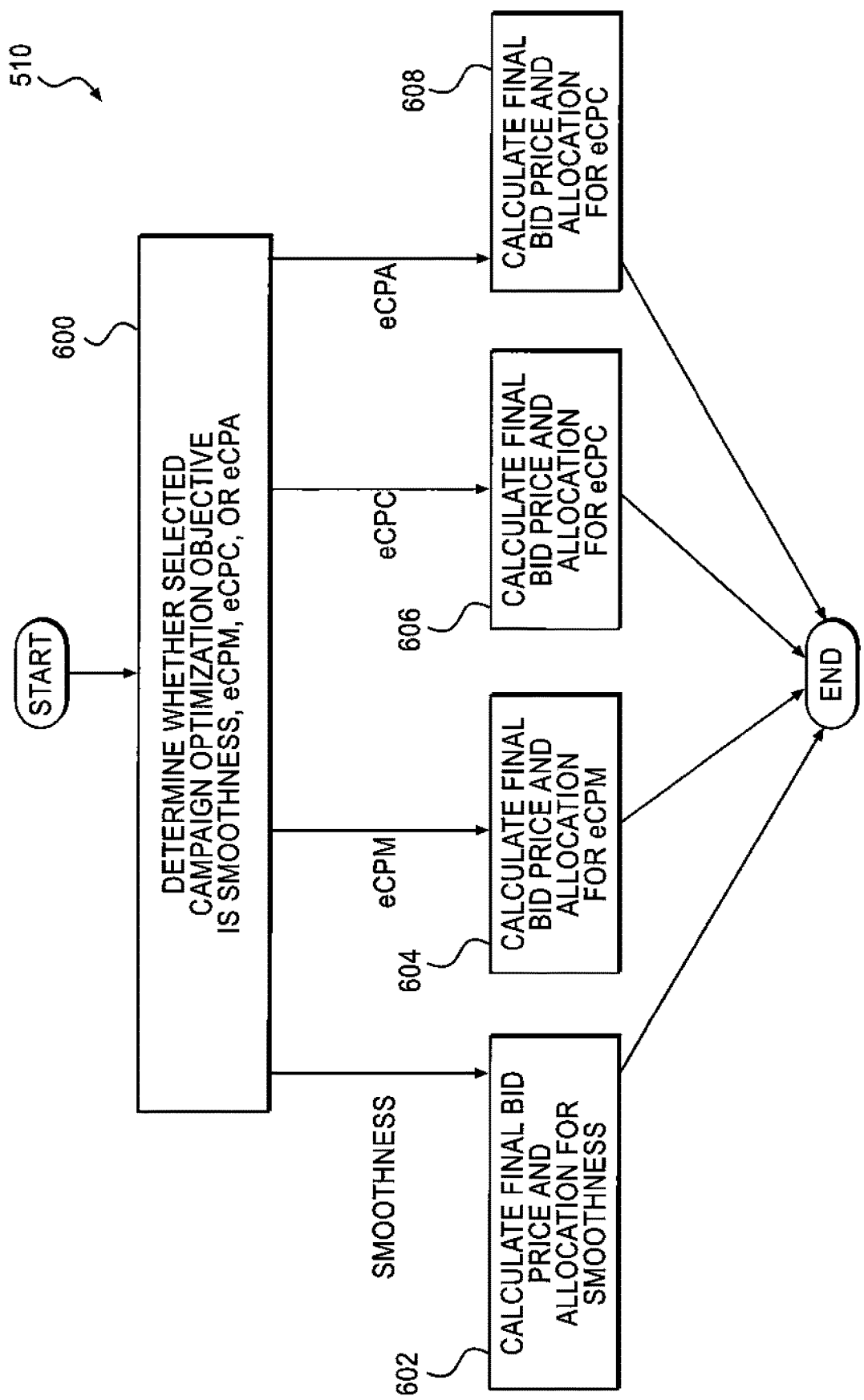
FIG. 9 illustrates a flow diagram of an exemplary method for controlling online advertising campaigns, consistent with embodiments of the present disclosure.

FIG. 9 depicts a flow diagram illustrating an exemplary representation of step 510 (FIG. 8), i.e., the step for calculating a final bid price $b_{ij}^{final}(k)$ and final bid allocation $a_{ij}^{final}(k)$, in greater detail. In one embodiment, in connection with step 510, method 500 may determine whether the selected campaign optimization objective is the smoothness, eCPM, eCPC, or eCPA objective (step 600). That is, method 500 may determine which campaign optimization objective the user has selected via the GUI or web portal associated with controller 108.

If the selected campaign objective is smoothness, method 500 may include calculating a final bid price $b_{ij}^{final}(k)$ and final bid allocation $a_{ij}^{final}(k)$ specific to the smoothness objective (step 602). In one embodiment, unit actuator 252 may calculate the final bid price $b_{ij}^{final}(k)$ and final bid allocation $a_{ij}^{final}(k)$ for the smoothness objective according to the following algorithm:

$$b_{ij}^{final}(k) = \frac{\frac{u^{p,campaign}(k)r_{ij}^{max}}{1+m^{Agency}} - r^{idf} - r^{edf}}{1+m^{Aol}}$$

$$a_{ij}^{final}(k) = a_{ij}^{baseline}(k)u^{a,campaign}(k),$$

where $r^{idf}$ and $r^{edf}$ are internal and external data fees, charged per impression, related to the cost of serving ads and verifying data; $m^{Agency}$ is an agency commission fee per impression, in the form of a percentage of the maximum bid price $r_{ij}^{max}(k)$ for an impression, charged by the ad agency; $m^{Aol}$ is a management fee per impression, in the form of a percentage of the final bid price $b_{ij}^{final}(k)$, paid by the user for using the disclosed campaign management services; and $a_{ij}^{baseline}(k)$ is a preset baseline allocation for the inventory unit 232-236 (e.g., cell {i,j}). Additionally, $u^{p,campaign}(k)$ represents a value of a campaign level price control signal generated at time k, while $u^{a,campaign}(k)$ represents a value of a campaign level bid allocation control signal generated at time k. In connection with the smoothness optimization objective, $u^{p,campaign}(k)$ and $u^{a,campaign}(k)$ are set as follows:

$$u^{p,campaign}(k)=1, \ u^{a,campaign}(k)=u^{rs}(k)$$

Accordingly, based on the algorithm above, it is to be appreciated that when using the smoothness objective, the final bid price $b_{ij}^{final}(k)$ is generally proportional to the maximum bid price $r_{ij}^{final}(k)$ for an impression which, as discussed, is set in advance by the user when configuring the campaign. Additionally, the value of the final bid allocation $a_{ij}^{final}(k)$ is modified by the campaign level control signal $u^{rs}(k)$ to control the pace of the advertising campaign. Thus, in comparison with conventional smoothness advertising campaign control, the disclosed smoothness objective algorithm may reduce the average cost per impression paid by the user (e.g., advertiser) because the user has the ability to set the maximum bid price $r_{ij}^{max}(k)$ for an impression at the time of setting up the campaign.

Returning to FIG. 9, if the selected campaign objective is eCPM, method 500 may include calculating a final bid price $b_{ij}^{final}(k)$ and final bid allocation $a_{ij}^{final}(k)$ for the eCPM objective (step 604). In one embodiment, unit actuator 252 may calculate the final bid price $b_{ij}^{final}(k)$ and final bid allocation $a_{ij}^{final}(k)$ for the eCPM objective according to the following algorithm:

$$b_{ij}^{final}(k) = \frac{\frac{u^{p,campaign}(k)r_{ij}^{max}}{1+m^{Agency}} - r^{idf} - r^{edf}}{1+m^{Aol}}$$

$$a_{ij}^{final}(k) = a_{ij}^{baseline}(k)u^{a,campaign}(k),$$

where, again, $r^{idf}$ and $r^{edf}$ are internal and external data fees, charged per impression, related to the cost of serving ads and verifying data; $m^{Agency}$ is an agency commission fee per impression, in the form of a percentage of the maximum bid price $r_{ij}^{max}(k)$ for an impression, charged by the ad agency; $m^{Aol}$ is a management fee per impression, in the form of a percentage of the final bid price $b_{ij}^{final}(k)$, paid by the user for using the disclosed campaign management services; and $a_{ij}^{baseline}(k)$ is a baseline allocation for the inventory unit 232-236 (e.g., cell {i,j}). As with the smoothness objective, $u^{p,campaign}(k)$ represents a value of a campaign level price control signal generated at time k, while $u^{a,campaign}(k)$ represents a value of a campaign level bid allocation control signal generated at time k. But, in contrast with the smoothness objective, $u^{p,campaign}(k)$ and $u^{a,campaign}(k)$ in the eCPM objective are set as follows:

$$u^{p,campaign}(k)=u^{rs}(k), \ u^{a,campaign}(k)=1$$

Accordingly, based on the algorithm above, it is to be appreciated that when using the eCPM objective, the final bid price $b_{ij}^{final}(k)$ generally proportional to the maximum bid price $r_{ij}^{max}(k)$ for an impression, as modified by the campaign level control signal $u^{rs}(k)$. Additionally, the final bid allocation $a_{ij}^{final}(k)$ is essentially set equal to the baseline allocation $a_{ij}^{baseline}(k)$ for the inventory unit 232-236, meaning that controller 108 may control the campaign as to participate in the baseline percentage $a_{ij}^{baseline}(k)$ of auctions for the inventory unit 232-236. Accordingly, in the eCPM objective, campaign pacing may be controlled generally based on the final bid price $b_{ij}^{final}(k)$ modified by the campaign level control signal $u^{rs}(k)$. Thus, in comparison with conventional advertising campaign control, the disclosed eCPM optimization objective may reduce the average cost per impression paid by the user (e.g., advertiser) because the user has the ability to set the maximum bid price $r_{ij}^{max}(k)$ for an impression at the time of setting up the campaign.

If the selected campaign objective is eCPC, method 500 may include calculating a final bid price $b_{ij}^{final}(k)$ and final bid allocation $a_{ij}^{final}(k)$ specific to the eCPC objective (step 606). In one embodiment, unit actuator 252 may calculate the final bid price $b_{ij}^{final}(k)$ and final bid allocation $a_{ij}^{final}(k)$ for the eCPC objective according to the following algorithm:

$$b_{ij}^{final}(k) = \frac{\frac{\min\{u^{p,campaign}(k)T^{cost}\hat{p}_{ij}^{I2C}(k), r_{ij}^{max}\}}{1+m^{Agency}} - r^{idf} - r^{edf}}{1+m^{Aol}}$$

$$a_{ij}^{final}(k) = a_{ij}^{baseline}(k)u^{a,campaign}(k),$$

where $r^{idf}$ and $r^{edf}$ are internal and external data fees, charged per impression, related to the cost of serving ads and verifying data; $m^{Agency}$ is an agency commission fee per impression, in the form of a percentage of the maximum bid price $r_{ij}^{max}(k)$ for an impression, charged by the ad agency; $m^{Aol}$ is a management fee, in the form of a percentage of the final bid price $b_{ij}^{final}(k)$, paid by the user for using the disclosed campaign management services; and $a_{ij}^{baseline}(k)$ is a baseline allocation for the inventory unit 232-236 (e.g., cell {i,j}). Further, $T^{cost}(k)$ is a target cost-per-click for the inventory 232-236, which may be set by the user (i.e., advertiser) when setting up the campaign. And $\hat{p}_{ij}^{I2C}(k)$ is an estimated click-through rate for the inventory unit 232-236 (e.g., cell {i,j}), as determined based on the performance feedback information from sensor 208. For example, sensor 208 may detect clicks on ads associated with one or more inventory units 232-236 within a period of time, and a click-through rate may be determined or estimated based on the detected number of clicks (e.g., by actuator 252). Similar to the other optimization objectives discussed above, $u^{p,campaign}(k)$ represents a value of a campaign level price control signal generated at time k, while $u^{a,campaign}(k)$ represents a value of a campaign level bid allocation control signal generated at time k. And, as with the eCPM objective, in the eCPC objective, $u^{p,campaign}(k)$ and $u^{a,campaign}(k)$ are set as follows:

$$u^{p,campaign}(k)=u^{r,s}(k),\ u^{a,campaign}(k)=1$$

Accordingly, based on the algorithm above, it is to be appreciated that when using the eCPC objective, the final bid price $b_{ij}^{final}(k)$ is generally proportional to the minimum of (1) the maximum bid price $r_{ij}^{max}(k)$ for an impression (set by the user) and (2) the target cost-per-click $T^{cost}(k)$ for the inventory 232-236 (also set by the user) multiplied by the estimated click-through rate $\hat{p}_{ij}^{12C}(k)$ for the inventory unit 232-236, as modified by the campaign level control signal $u^{rs}(k)$. That is, the final bid price $b_{ij}^{final}(k)$ is generally proportional to whichever is less between: (1) the maximum bid price $r_{ij}^{max}(k)$ for an impression or (2) the target cost-per-click $T^{cost}(k)$ for the inventory 232-236 multiplied by the estimated click-through rate $\hat{p}_{ij}^{12C}(k)$ for the inventory unit 232-236, as modified by the campaign level control signal $u^{rs}(k)$. Additionally, the final bid allocation $a_{ij}^{final}(k)$ is essentially set equal to the baseline allocation $a_{ij}^{baseline}(k)$ for the inventory unit 232-236, meaning that actuator 252 may control the campaign as to participate in the baseline percentage $a_{ij}^{baseline}(k)$ auctions for the inventory unit 232-236.

Accordingly, in the eCPC objective, campaign pacing may be controlled generally based on whichever is less between: (1) the maximum bid price $r_{ij}^{max}(k)$ for an impression or (2) the target cost-per-click $T^{cost}(k)$ for the inventory 232-236 multiplied by the estimated click-through rate for the inventory unit 232-236 $\hat{p}_{ij}^{12C}(k)$, as modified by the campaign level control signal $u^{rs}(k)$. Thus, in comparison with conventional advertising campaign control, which tends to maximize ad revenue for the ad network, the disclosed eCPC algorithm can reduce the average cost-per-click paid by the user (e.g., advertiser). This is because the algorithm takes into consideration (1) the maximum bid price $r_{ij}^{max}(k)$ for an impression that the user is willing to pay as well as (2) the "value" of the inventory 232-236, as represented by the target cost-per-click $T^{cost}(k)$ for the inventory 232-236 (set by the user) multiplied by the estimated click-through rate for the inventory unit 232-236 $\hat{p}_{ij}^{12C}(k)$, and generates the final bid price $b_{ij}^{final}(k)$ based on the lesser of the two. Accordingly, in the disclosed eCPC algorithm, the user may not "pay" more for an impression than what it is worth in terms of the performance of the inventory 232-236 with respect to click-through rate $\hat{p}_{ij}^{12C}(k)$ for ads placed therein. And, at the same time, the algorithm may ensure that the user does not pay more that what he/she has set as the maximum bid price $r_{ij}^{max}(k)$ for an impression when configuring the campaign.

Finally, if the selected campaign objective is eCPA, method 500 may include calculating a final bid price $b_{ij}^{final}(k)$ and final bid allocation $a_{ij}^{final}(k)$ specific to the eCPA objective (step 608). In one embodiment, unit actuator 252 may calculate the final bid price $b_{ij}^{final}(k)$ and final bid allocation $a_{ij}^{final}(k)$ for the eCPA objective according to the following algorithm:

$$b_{ij}^{final}(k) = \frac{\frac{\min\{u^{p,campaign}(k)T^{cost}\hat{p}_{ij}^{12A}(k),r_{ij}^{max}\}}{1+m^{Agency}} - r^{idf} - r^{edf}}{1+m^{Aol}}$$

$$a_{ij}^{final}(k) = a_{ij}^{baseline}(k)u^{a,campaign}(k),$$

where, again, $r^{idf}$ and $r^{edf}$ are internal and external data fees, charged per impression, related to the cost of serving ads and verifying data; $m^{Agency}$ is an agency commission fee per impression, in the form of a percentage of the maximum bid price $r_{ij}^{max}(k)$ (set by the user) for an impression, charged by the ad agency; $m^{Aol}$ is a management fee, in the form of a percentage of the final bid price $b_{ij}^{final}(k)$, paid by the user for using the disclosed campaign management services; and $a_{ij}^{baseline}(k)$ is a baseline allocation for the inventory unit 232-236 (e.g., cell $\{i,j\}$). Further, $T^{cost}(k)$ is a target cost-per-conversion for the inventory 232-236, which may be set by the user (i.e., advertiser), and $\hat{p}_{ij}^{12A}(k)$ is an estimated conversion rate for the inventory unit 232-236 (e.g., cell ($\{i,j\}$), as determined based on the performance feedback information received from sensor 208. For example, sensor 208 may detect conversions of ads associated with one or more inventory units 232-236 within a period of time, and a conversion rate may be determined or estimated based on the detected number of clicks (e.g., by actuator 252). Similar to the other optimization objectives discussed above, $u^{p,campaign}(k)$ represents a value of a campaign level price control signal generated at time k, while $u^{a,campaign}(k)$ represents a value of a campaign level bid allocation control signal generated at time k. And, as with the eCPC objective, in the eCPA objective, $u^{p,campaign}(k)$ and $u^{a,campaign}(k)$ are set as follows:

$$u^{p,campaign}(k)=u^{r,s}(k),\ u^{a,campaign}(k)=1$$

Accordingly, based on the algorithm above, it is to be appreciated that when using the eCPA objective, the final bid price $b_{ij}^{final}(k)$ is generally proportional to the minimum of (1) the maximum bid price $r_{ij}^{max}(k)$ for an impression that the user is willing to pay and (2) the target cost-per-conversion $T^{cost}(k)$ for the inventory 232-236 multiplied by the estimated conversion rate $\hat{p}_{ij}^{12A}(k)$ for the inventory unit 232-236, as modified by the campaign level control signal $u^{rs}(k)$. That is, the final bid price $b_{ij}^{final}(k)$ is generally proportional to whichever is less between: (1) the maximum bid price $r_{ij}^{max}(k)$ for an impression and (2) the target cost-per-conversion $T^{cost}(k)$ for the inventory 232-236 multiplied by the estimated conversion rate $\hat{p}_{ij}^{12A}(k)$ or the inventory unit 232-236, as modified by the campaign level control signal $u^{rs}(k)$. Additionally, the final bid allocation $a_{ij}^{final}(k)$ is essentially set equal to the baseline allocation $a_{ij}^{baseline}(k)$ for the inventory unit 232-236, meaning that controller 108 may control the campaign as to participate in the baseline percentage $a_{ij}^{baseline}(k)$ auctions for the inventory unit 232-236.

Accordingly, in the disclosed eCPA objective, campaign pacing may be controlled generally based on whichever is less between: (1) the maximum bid price $r_{ij}^{max}(k)$ for an impression or (2) the target cost-per-conversion $T^{cost}(k)$ for the inventory 232-236 multiplied by the estimated conversion rate $\hat{p}_{ij}^{12A}(k)$ for the inventory unit 232-236, as modified by the campaign level control signal $u^{rs}(k)$. Thus, in comparison with conventional advertising campaign control, which tends to maximize ad revenue for the ad network, the disclosed eCPA optimization algorithm may reduce the average cost-per-conversion paid by the user (e.g., advertiser). This is because the algorithm takes into consideration (1) the maximum bid price $r_{ij}^{max}(k)$ for an impression the user is willing to pay as well as (2) the "value" of the inventory 232-236, as represented by the target cost-per-conversion $T^{cost}(k)$ (set by the user) multiplied by the estimated conversion rate $\hat{p}_{ij}^{12A}(k)$ for the inventory unit 232-236, and generates the final bid price $b_{ij}^{final}(k)$ based on the lesser of the two. Accordingly, in the eCPA algorithm, the user may not pay more for an impression than what it is worth in terms of the performance of the inventory 232-236 with respect to the conversion rate $\hat{p}_{ij}^{12C}(k)$ of ads placed therein.

Figure 10:
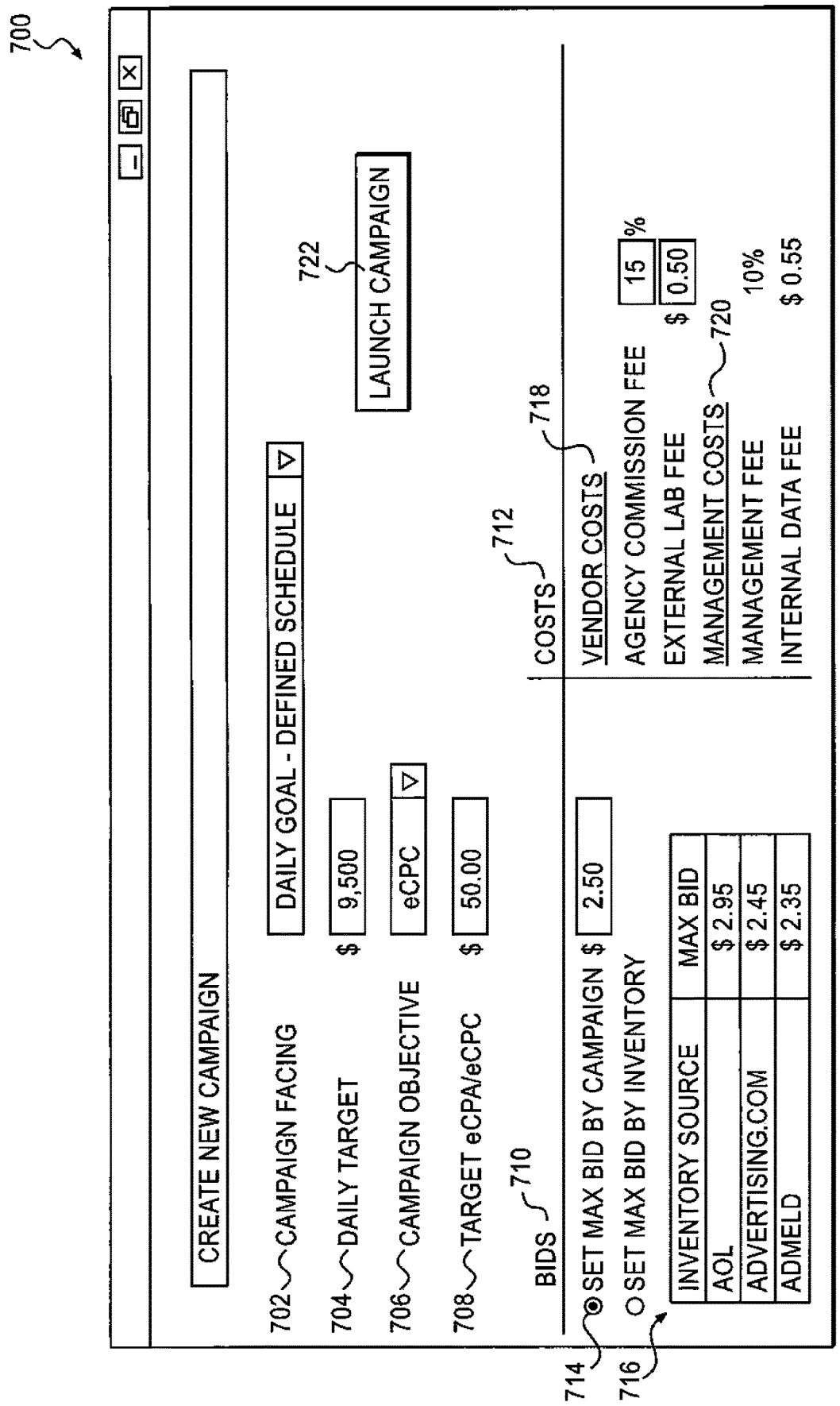
FIG. 10 illustrates a graphical user interface (GUI) for controlling online advertising campaigns, consistent with embodiments of the present disclosure.

FIG. 10 illustrates a representation of an exemplary graphical user interface (GUI) 700 for configuring an online advertising campaign, consistent with embodiments of the present disclosure. In one configuration, GUI 700 may be a web portal or application associated with one or more of controllers 108 that enables a user (e.g., associated with an advertiser 102) to configure an advertising campaign to operate as described above. As shown in the figure, GUI 700 may include a campaign pacing setting 702, a daily target setting 704, campaign objective setting 706, and/or a target eCPA/eCPC setting 708. Each of these settings may comprise one or more user interface (UI) elements, such as a drop-down menu, radio button, etc., allowing the user to select a desired value for that setting.

Campaign pacing setting 702 may allow the user to select a desired campaign pacing option for the advertising campaign. For example, the user may select from one or more of: an as-fast-as-possible (AFAP) pacing option, a defined-schedule pacing option, and a keep-schedule pacing option. In one embodiment, selecting the AFAP option may cause control system 200 (FIG. 2) to control the advertising campaign 202 to deliver the campaign, or spend the allocated advertising budget, as fast as possible. That is, this option may cause control system 200 to attempt to win all the impressions it can without regard for a maximum permitted bid $r_{ij}^{max}(k)$ for an impression and/or also without regard for the "value" of an inventory unit 232-236 in terms of click-through rate, conversion rate, or other performance metric. Accordingly, if the AFAP option is selected, none of the above-described campaign optimization objectives may be available to the user. In contrast, selecting the defined-schedule pacing option may cause control system 200 to attempt to smoothly spend the advertising budget such that the daily spending target 704 (e.g., $9,500) is spent each day. Also, if the keep-schedule pacing option is selected, the control system 200 may automatically determine a daily spending goal based on campaign delivery history and market conditions. Additionally, if either of these options is selected, the above-described optimization objectives may be available to the user.

Campaign objective setting 706 may allow the user to select a desired campaign optimization option for the advertising campaign. For example, the user may select from one or more of: a smoothness optimization objective, an eCPM optimization objective, an eCPC optimization objective, and an eCPA optimization objective. In one embodiment, if the user selects one of these objectives, control system 200 may apply its respective algorithm, discussed above, in order to control campaign delivery and calculate the final bid price $b_{ij}^{final}(k)$ and final bid allocation $a_{ij}^{final}(k)$ for the campaign. In addition, if the eCPA or the eCPC optimization is selected by the user, the user may also enter a desired target cost-per-click or conversion cost, $T^{cost}(k)$, for the campaign via target eCPA/eCPC setting 708. As discussed, this value represents a dollar value the user (i.e., advertiser) associates with a consumer clicking on or converting a placed advertisement. For example, a user in the marketing department of an automobile manufacturer may determine that an Internet consumer clicking or converting one of its ads for a new automobile ad campaign is worth $50.00, based on the likelihood of the consumer becoming interested in the automobile and eventually purchasing it. Accordingly, in this example, the user may set $T^{cost}(k)$ to $50.00. Subsequently, during operation of the campaign, the eCPC/eCPA algorithm (whichever is selected by the user) may calculate the final bid price $b_{ij}^{final}(k)$ for an impression from an inventory 232-236 unit based its "value" as determined by the $T^{cost}(k)$ of $50.00 and its estimated click-through/conversion rate $\hat{p}_{ij}^{12C}(k)/\hat{p}_{ij}^{12A}(k)$, as described above.

As shown in FIG. 10, GUI 700 may also include a bids interface 710 and a costs interface 712. Bids interface 712 may include various options allowing the user to set the maximum allowed bid price for an impression, $r_{ij}^{max}(k)$. For example, bids interface 710 may include a campaign level bid price setting 714 allowing the user to specify a desired maximum allowed bid price $r_{ij}^{max}(k)$ (e.g., $2.50) for an impression, at the campaign level. If this option is used, control system 200 may use the set maximum allowed bid price $r_{ij}^{max}(k)$ to bid on all impressions on the campaign, regardless of the particular inventory unit 232-236 from which the impression originates. Accordingly, in one embodiment, if the user selects a desired maximum allowed bid price $r_{ij}^{max}(k)$ at the campaign level using campaign level bid price setting 714, control system 200 may use the input value as $r_{ij}^{max}(k)$ when applying the various algorithms discussed above for impressions from all inventory units 232-236 through the course of the campaign.

Bids interface 710 may further include an inventory level bid price setting 716 allowing the user to specify distinct maximum allowed bid prices $r_{ij}^{max}(k)$ for impressions from different inventories 232-236, i.e., at the inventory level. For example, FIG. 10 illustrates that the user may specify a first maximum allowed bid price $r_{ij}^{max}(k)$ (e.g., $2.95) for impressions from AOL® inventory, a second maximum allowed bid price $r_{ij}^{max}(k)$ (e.g., $2.45) for impressions from Advertising.com® inventory, and a third maximum allowed bid price $r_{ij}^{max}(k)$ (e.g., $2.35) for impressions from Admeld® inventory. It is to be appreciated, however, that the user may be able to specify maximum allowed bid prices $r_{ij}^{max}(k)$ for impressions from any number of distinct ad inventories, if desired. In one embodiment, if the user sets a desired maximum allowed bid price $r_{ij}^{max}$ for specific inventory (e.g., AOL) via inventory level bid price setting 714, control system 200 may use the input value as $r_{ij}^{max}(k)$ when applying the various optimization algorithms discussed above, but only with respect to impressions coming from inventory units 232-236 associated with the specified inventory (i.e., AOL).

Continuing with FIG. 10, costs interface 712 may provide information regarding the costs associated with the advertising campaign being set up. For example, costs interface 712 may display vendor costs 718 and management costs 720 associated with the advertising campaign. In one embodiment, the vendor costs 718 may display, and/or allow the user to modify, the agency commission fee $m^{Agency}$ (e.g., 10%) charged by the ad network for the campaign. Additionally, vendor costs 718 may display, and/or allow the user to modify, the external data fee $r^{edf}$ (e.g., $0.50 per impression) for the campaign.

Management costs 720 may include, for example, the management fee $m^{Aol}$ 1 the user (i.e., advertiser) is being charged per impression for enjoying the benefit of using the disclosed campaign management services. In addition, management costs 720 may include the internal data fee $r^{idf}$ (e.g., $0.55 per impression) the user (i.e., advertiser) is being charged per impression during the campaign.

GUI 700 may further include a launch campaign UI element 722. When the user selects this element, the various campaign settings 702-708, 714, 716, 718 the user entered via GUI 700 may be provided as campaign configuration information 222 (FIG. 4) to control system 200. Subsequently, control system 200 may control the campaign based on the campaign configuration information 222, as described above.

The disclosed systems and methods may improve the performance of online advertising campaigns. For example, it is to be appreciated that the disclosed techniques may provide a user (e.g., advertiser) with great flexibility to customize an online advertising campaign in a way that not only meets the ad network's revenue goals, but also reduces the cost, and increases the performance, of the campaign from the perspective of the user. In particular, as discussed, the user is permitted to select from among a plurality of different campaign optimization techniques (e.g., smoothness, eCPM, eCPC, and eCPA) that can reduce the cost of the campaign and improve its performance. Specifically, as described, the disclosed smoothness and eCPM objectives each allows the user to set a desired a maximum allowed cost for impression $r_{ij}^{max}(k)$, either at the campaign level or at the inventory level, which is used to control campaign delivery. As a result, when using these objectives, the average cost per impression can be optimized or reduced in favor of the user.

Similarly, the disclosed eCPC/eCPA objectives also each allows the user to set a desired a maximum permitted cost for impression $r_{ij}^{max}(k)$, either at the campaign level or at the inventory level, which is used to control campaign delivery. In addition to considering this maximum allowed cost for impression $r_{ij}^{max}(k)$, the eCPC/eCPA objective also allows the user to specify a target cost-per-click/conversion $T^{cost}(k)$. As discussed, the disclosed algorithms use this target cost-per-click/conversion $T^{cost}(k)$ and the estimated performance of inventory units, as represented by its estimated click-through/conversion rate $\hat{p}_{ij}^{12C}(k)/\hat{p}_{ij}^{12A}(k)$, to determine a performance "value" for the inventory. The eCPC/eCPA objectives then calculate the final bid price $b_{ij}^{final}(k)$ based on whichever is less between the maximum allowed bid for impression $r_{ij}^{max}(k)$ and the calculated performance value of the inventory unit. Accordingly, in the disclosed eCPC/eCPA optimization algorithms, the user may not pay more for an impression than what the user has specified it is worth in terms of its click-through/conversion rate. Additionally, the disclosed algorithms may "cap" the final bid price $b_{ij}^{final}(k)$ based on what the user has specified as the maximum allowed cost for impression $r_{ij}^{max}(k)$.

The disclosed techniques may also provide improved transparency and control to the user (i.e., advertiser) in terms of how an online advertising campaign is operated. For example, as described above, the user has access to the cost information 712 associated with the campaign, via GUI 700. Also, as discussed, the user has the flexibility to specify maximum allowed bid for impression $r_{ij}^{max}(k)$ at the campaign level and/or inventory level. Accordingly, in comparison to conventional advertising techniques in which the user is not aware of the hidden costs and fees associated with running a campaign, and does not have such granular control over how the advertising budget is spent, the disclosed techniques can offer improved transparency and control to the user.

One skilled in the art will appreciate that computer programs for implementing the methods of may be stored on and/or read from computer-readable storage media. The computer-readable storage media may have stored thereon computer-executable instructions which, when executed by a computer (e.g., one or more components of system 100), cause the computer to perform, among other things, the processes disclosed herein. Exemplary computer-readable storage media may include magnetic storage devices, such as a hard disk, a floppy disk, magnetic tape, or another magnetic storage device known in the art; optical storage devices, such as CD-ROM, DVD-ROM, or another optical storage device known in the art; and/or electronic storage devices, such as EPROM, a flash drive, or another integrated circuit storage device known in the art. The computer-readable storage media may be embodied by or in one or more components of system 100 (FIG. 1).

The many features and advantages of the disclosure are apparent from the detailed specification, and thus, it is intended by the appended claims to cover all such features and advantages of the disclosure which fall within the spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A control system for controlling an online advertising campaign, the control system comprising:
    at least one first processor configured to:
        provide a feedback signal reflecting at least one real-time delivery metric associated with an advertising delivery goal for a current sampling period regarding one or more impressions of the online advertising campaign at a plurality of inventory units, the at least one real-time delivery metric including one or more ad events associated with the plurality of inventory units; and
        generate a delivery reference signal particular to each of the plurality of inventory units based on the feedback signal and configuration information for the online advertising campaign;
    at least one second processor, associated with each inventory unit of the plurality of inventory units, configured to compensate the feedback signal based on a day of a week and time of the day according to a moving sum of the feedback signal over a predetermined time interval, normalize the compensated feedback signal and the delivery reference signal based on an estimated gain value of a corresponding inventory unit and a control signal from a prior sampling period, compare the normalized compensated feedback signal to the normalized delivery reference signal for the corresponding inventory unit, and generate a campaign level control signal for the corresponding inventory unit based on the comparison; and
    at least one third processor, associated with each inventory unit of the plurality of inventory units, configured to:
        receive, from a user via a graphical user interface, a maximum allowed cost per impression for the corresponding inventory unit of the online advertising campaign;
        receive, from the user via the graphical user interface, a selection of an effective cost per thousand impressions (eCPM) as an optimization objective for the online advertising campaign to reduce average cost per impression over a course of the online advertising campaign;
        calculate, for the corresponding inventory unit, at least a final bid price based on the maximum allowed cost per impression for the corresponding inventory unit, the corresponding campaign level control signal received from the at least one second processor, and the eCPM selected by the user via the graphical user interface; and submit, to an electronic market and based on the calculated final bid price, a bid on an impression at the corresponding inventory unit.

2. The control system of claim 1, wherein the at least one third processor is further configured to:

calculate, for the corresponding inventory unit, a bid allocation based on the optimization objective, on the maximum allowed cost per impression for the corresponding inventory unit, and on the campaign level control signal; and submit the bid based further on the calculated bid allocation.

3. The control system of claim 1, wherein the optimization objective is further selected from one of a reduced average cost per click, a reduced average cost per conversion, and a revenue smoothness objective, each of which is measured over the course of the online advertising campaign.

4. The control system of claim 1, wherein the one or more ad events include an ad click event.

5. The control system of claim 1, wherein the one or more ad events include an ad conversion event.

6. The control system of claim 1, wherein the at least one third processor is configured to calculate, for the corresponding inventory unit, a performance value by multiplying an ad event rate and a received target cost-per-ad event set by the user.

7. The control system of claim 6, wherein to calculate the final bid price, the at least one third processor is configured to:

determine which is less between the maximum allowed cost per impression for the corresponding inventory unit and the performance value for the corresponding inventory unit; and calculate the final bid price based on the lesser of the maximum allowed cost per impression for the corresponding inventory unit and the performance value for the corresponding inventory unit.

8. The control system of claim 6, wherein the graphical user interface allows the user to specify a maximum impression bid price for the entire online advertising campaign.

9. The control system of claim 6 wherein the graphical user interface displays to the user cost information associated with the advertising campaign, the cost information including at least one of an agency commission fee, an external data fee, a management fee, or an internal data fee associated with bidding on impressions at the plurality of inventory units.

10. A computer-controlled method for controlling an online advertising campaign, the computer-controlled method comprising:

receiving, by a first processor associated with a corresponding inventory unit of a plurality of inventory units, a feedback signal reflecting at least one real-time delivery metric associated with an advertising delivery goal for a current sampling period regarding one or more impressions of the online advertising campaign at the plurality of inventory units;

receiving, by the first processor, a delivery reference signal particular to the corresponding inventory unit, wherein the delivery reference signal comprises configuration information for the online advertising campaign;

compensating, by the first processor, the received feedback signal based on a day of a week and time of the day according to a moving sum of the feedback signal over a predetermined time interval, the first processor further configured to normalize the compensated feedback signal and the delivery reference signal based on an estimated gain value of the corresponding inventory unit and a control signal from a prior sampling period;

comparing the normalized compensated feedback signal to the normalized delivery reference signal for the corresponding inventory unit associated with the first processor to generate a campaign level control signal for the corresponding inventory unit;

receiving, by a second processor associated with the corresponding inventory unit of the plurality of inventory units, information identifying one or more ad events associated with the corresponding inventory unit, a maximum allowed cost per impression for the corresponding inventory unit of the online advertising campaign from a user via a graphical user interface, and a selection, by the user via the graphical user interface, of an effective cost per thousand impressions (eCPM) as an optimization objective for the online advertising campaign to reduce average cost per impression over a course of the online advertising campaign;

calculating, using the second processor, at least a final bid price based on the maximum allowed cost per impression for the corresponding inventory unit, the corresponding campaign level control signal, and the eCPM selected by the user via the graphical user interface; and submitting, to an electronic market and based on the calculated final bid price, a bid on an impression at the corresponding inventory unit.

11. The computer-controlled method of claim 10, further comprising:

calculating, for the corresponding inventory unit, a bid allocation based on the optimization objective, on the maximum allowed cost per impression for the corresponding inventory unit, and on the campaign level control signal; and submitting the bid based further on the calculated bid allocation.

12. The computer-controlled method of claim 10, wherein the optimization objective is further selected from one of a reduced average cost per click, a reduced average cost per conversion, and a revenue smoothness objective, each of which is measured over the course of the online advertising campaign.

13. The computer-controlled method of claim 10, wherein the one or more ad events include an ad click event.

14. The computer-controlled method of claim 10, wherein the one or more ad events include an ad conversion event.

15. The computer-controlled method of claim 10, further comprising calculating, for the corresponding inventory unit, a performance value by multiplying an ad event rate and the received target cost-per-ad event set by the user.

16. The computer-controlled method of claim 15, wherein calculating the final bid price includes:

determining which is less between the maximum allowed cost per impression for the corresponding inventory unit and the performance value for the corresponding inventory unit; and calculating the final bid price based on the lesser of the maximum allowed cost per impression for the corresponding inventory unit and the performance value for the corresponding inventory unit.

17. The computer-controlled method of claim 10, further comprising displaying to the user, via the graphical user interface, cost information associated with the advertising campaign, the cost information including at least one of an agency commission fee, an external data fee, a management fee, and an internal data fee associated with bidding on impressions at the plurality of inventory units.

18. The computer-controlled method of claim 10, wherein the graphical user interface allows the user to specify a maximum impression bid price for the entire online advertising campaign.

\* \* \* \* \*